United States Patent
Langdon et al.

(10) Patent No.: US 11,250,450 B1
(45) Date of Patent: Feb. 15, 2022

(54) METHOD AND SYSTEM FOR PROGRAMMATIC GENERATION OF SURVEY QUERIES

(71) Applicant: Groupon, Inc., Chicago, IL (US)

(72) Inventors: Daniel Langdon, Palo Alto, CA (US); Bhupesh Bansal, Sunnyvale, CA (US); Gaston L'Huillier, San Francisco, CA (US)

(73) Assignee: Groupon, Inc., Chicago, IL (US)

( * ) Notice: Subject to any disclaimer, the term of this patent is extended or adjusted under 35 U.S.C. 154(b) by 423 days.

(21) Appl. No.: 14/752,311

(22) Filed: Jun. 26, 2015

Related U.S. Application Data

(60) Provisional application No. 62/018,456, filed on Jun. 27, 2014.

(51) Int. Cl.
 *G06Q 30/02* (2012.01)
(52) U.S. Cl.
 CPC ..... *G06Q 30/0203* (2013.01); *G06Q 30/0282* (2013.01)
(58) Field of Classification Search
 None
 See application file for complete search history.

(56) References Cited

U.S. PATENT DOCUMENTS

| | | | |
|---|---|---|---|
| 5,331,556 A | 7/1994 | Black et al. | |
| 5,706,406 A | 1/1998 | Pollock | |
| 5,963,940 A | 10/1999 | Liddy et al. | |
| 6,577,947 B1 | 6/2003 | Kronfeld et al. | |
| 6,584,464 B1 | 6/2003 | Warthen | |
| 6,910,003 B1 | 6/2005 | Arnold et al. | |
| 6,950,786 B1 | 9/2005 | Sonneland et al. | |
| 7,015,922 B2 | 3/2006 | Wada | |
| 7,107,538 B1 | 9/2006 | Hinckley et al. | |
| 7,444,356 B2 | 10/2008 | Calistri-Yeh et al. | |
| 7,552,365 B1* | 6/2009 | Marsh ................. | G06F 11/0709 714/47.2 |
| 7,600,017 B2 | 10/2009 | Holtzman et al. | |
| 7,765,097 B1 | 7/2010 | Yu et al. | |
| 7,900,213 B2 | 3/2011 | Elaasar | |
| 7,945,600 B1 | 5/2011 | Thomas et al. | |

(Continued)

OTHER PUBLICATIONS

Fuchs, Gil Emanuel; "Practical Natural Language Processing Question Answering Using Graphs"; Dec. 2004; University of California.

(Continued)

*Primary Examiner* — Susanna M. Diaz
(74) *Attorney, Agent, or Firm* — Alston & Bird LLP

(57) ABSTRACT

Embodiments provide a computer-executable method for programmatically generating one or more survey queries. The method includes accessing information on a commercial entity or object. The method also includes, based on the accessed information, determining an attribute descriptor associated with the attribute. The method further includes programmatically generating a survey query indicating the attribute descriptor. The method further includes transmitting one or more computer-executable instructions to a computing device to cause a visual display device to render a user interface, the user interface displaying the survey query and enabling user input in response to the survey query.

39 Claims, 16 Drawing Sheets

(56) References Cited

U.S. PATENT DOCUMENTS

| | | | |
|---|---|---|---|
| 8,001,144 B2 | 8/2011 | Novak | |
| 8,046,348 B1 | 10/2011 | Rehling et al. | |
| 8,195,683 B2 | 6/2012 | Bolivar | |
| 8,209,335 B2 | 6/2012 | Novak | |
| 8,347,326 B2 | 1/2013 | Weitzenfeld et al. | |
| 8,645,295 B1* | 2/2014 | Dillard | G06Q 30/02 705/7.29 |
| 8,862,591 B2 | 10/2014 | Chowdhury et al. | |
| 8,949,243 B1 | 2/2015 | Kashyap et al. | |
| 8,977,953 B1 | 3/2015 | Pierre et al. | |
| 8,983,975 B2 | 3/2015 | Kenton et al. | |
| 9,020,956 B1* | 4/2015 | Barr | G06F 17/30864 707/748 |
| 9,063,927 B2 | 6/2015 | Hall | |
| 9,129,008 B1* | 9/2015 | Kuznetsov | G06F 16/435 |
| 9,317,566 B1* | 4/2016 | L'Huillier | G06N 20/00 |
| 9,607,325 B1* | 3/2017 | Sriram | G06Q 30/0282 |
| 9,741,058 B2* | 8/2017 | L'Huillier | G06F 16/951 |
| 9,924,102 B2 | 3/2018 | Gervautz et al. | |
| 10,878,017 B1* | 12/2020 | L'Huillier | G06F 16/35 |
| 2001/0020292 A1 | 9/2001 | McRobert | |
| 2002/0010637 A1 | 1/2002 | Lieu et al. | |
| 2002/0103809 A1 | 8/2002 | Starzl et al. | |
| 2002/0107834 A1 | 8/2002 | Yen et al. | |
| 2002/0165844 A1 | 11/2002 | Lee et al. | |
| 2003/0004971 A1 | 1/2003 | Gong et al. | |
| 2004/0059736 A1 | 3/2004 | Willse et al. | |
| 2004/0078190 A1 | 4/2004 | Fass et al. | |
| 2004/0186719 A1 | 9/2004 | Polanyi et al. | |
| 2004/0243554 A1 | 12/2004 | Broder et al. | |
| 2005/0028046 A1 | 2/2005 | McArdle | |
| 2005/0060324 A1 | 3/2005 | Johnson et al. | |
| 2005/0108001 A1 | 5/2005 | Aarskog | |
| 2005/0125216 A1 | 6/2005 | Chitrapura et al. | |
| 2005/0149383 A1* | 7/2005 | Zacharia | G06Q 10/04 705/7.29 |
| 2005/0165819 A1 | 7/2005 | Kudoh et al. | |
| 2005/0267871 A1 | 12/2005 | Marchisio et al. | |
| 2006/0069589 A1 | 3/2006 | Nigam et al. | |
| 2006/0248440 A1 | 11/2006 | Rhoads et al. | |
| 2006/0277465 A1 | 12/2006 | Pandit et al. | |
| 2007/0027672 A1 | 2/2007 | Decary et al. | |
| 2007/0073533 A1 | 3/2007 | Thione et al. | |
| 2007/0073745 A1 | 3/2007 | Scott et al. | |
| 2007/0073758 A1 | 3/2007 | Perry et al. | |
| 2007/0094234 A1 | 4/2007 | Wen et al. | |
| 2007/0106499 A1 | 5/2007 | Dahlgren et al. | |
| 2007/0282872 A1 | 12/2007 | Probst et al. | |
| 2008/0109212 A1 | 5/2008 | Witbrock et al. | |
| 2008/0133488 A1* | 6/2008 | Bandaru | G06F 16/951 |
| 2008/0154883 A1 | 6/2008 | Chowdhury et al. | |
| 2008/0201348 A1 | 8/2008 | Edmonds et al. | |
| 2008/0249764 A1* | 10/2008 | Huang | G06F 17/2785 704/9 |
| 2008/0294637 A1 | 11/2008 | Liu | |
| 2009/0063247 A1* | 3/2009 | Burgess | G06Q 30/02 705/7.34 |
| 2009/0063304 A1* | 3/2009 | Meggs | G06Q 10/06 705/26.62 |
| 2009/0077069 A1 | 3/2009 | Polanyi et al. | |
| 2009/0112892 A1 | 4/2009 | Cardie et al. | |
| 2009/0171956 A1 | 7/2009 | Gupta et al. | |
| 2009/0193328 A1 | 7/2009 | Reis et al. | |
| 2009/0216524 A1 | 8/2009 | Skubacz et al. | |
| 2009/0217208 A1 | 8/2009 | Mushtaq et al. | |
| 2009/0222551 A1 | 9/2009 | Neely et al. | |
| 2009/0282019 A1 | 11/2009 | Galitsky et al. | |
| 2009/0319342 A1 | 12/2009 | Shilman et al. | |
| 2010/0038416 A1* | 2/2010 | Canora | G06Q 30/02 235/375 |
| 2010/0198584 A1 | 8/2010 | Habu et al. | |
| 2011/0060746 A1* | 3/2011 | Dalvi | G06F 16/353 707/750 |
| 2011/0078167 A1* | 3/2011 | Sundaresan | G06F 17/2785 707/765 |
| 2011/0196927 A1* | 8/2011 | Vance | G06Q 30/02 709/204 |
| 2012/0066233 A1* | 3/2012 | Fonseka | G06F 17/30864 707/749 |
| 2012/0101808 A1 | 4/2012 | Duong-Van | |
| 2012/0209828 A1 | 8/2012 | Takenaka et al. | |
| 2012/0254060 A1 | 10/2012 | Choudhary et al. | |
| 2012/0278064 A1* | 11/2012 | Leary | G06F 40/253 704/9 |
| 2012/0278253 A1 | 11/2012 | Gahlot et al. | |
| 2012/0290606 A1 | 11/2012 | Kumar et al. | |
| 2012/0290910 A1* | 11/2012 | Kumar | G06F 16/972 715/205 |
| 2013/0018892 A1 | 1/2013 | Castellanos et al. | |
| 2013/0031062 A1 | 1/2013 | Iwamoto | |
| 2013/0080208 A1 | 3/2013 | Wang et al. | |
| 2013/0103667 A1 | 4/2013 | Minh | |
| 2013/0212105 A1 | 8/2013 | Hagiwara et al. | |
| 2013/0218822 A1* | 8/2013 | Remaker | G06N 5/02 706/45 |
| 2013/0247183 A1 | 9/2013 | Kumar et al. | |
| 2013/0263019 A1 | 10/2013 | Castellanos et al. | |
| 2013/0268457 A1 | 10/2013 | Wang et al. | |
| 2013/0268534 A1 | 10/2013 | Mathew et al. | |
| 2013/0311315 A1 | 11/2013 | Zises | |
| 2014/0067596 A1* | 3/2014 | McGovern | G06Q 30/02 705/26.7 |
| 2014/0136541 A1* | 5/2014 | Farahat | G06F 16/958 707/740 |
| 2014/0188459 A1* | 7/2014 | Fink | G06F 17/2785 704/9 |
| 2014/0278786 A1* | 9/2014 | Liu-Qiu-Yan | G06Q 30/0201 705/7.32 |
| 2015/0066803 A1 | 3/2015 | Aneja et al. | |
| 2015/0100554 A1 | 4/2015 | Wang et al. | |
| 2015/0186790 A1* | 7/2015 | Ehlen | G06Q 10/00 706/52 |
| 2015/0286627 A1 | 10/2015 | Chang et al. | |
| 2015/0286710 A1* | 10/2015 | Chang | G06F 17/30705 706/12 |
| 2015/0286928 A1 | 10/2015 | Demiralp et al. | |
| 2016/0275573 A1 | 9/2016 | L'Huillier et al. | |

OTHER PUBLICATIONS

Notice of Allowance for U.S. Appl. No. 12/119,465 dated Jan. 4, 2017.

Sato et al. "Topic Models with Power-Law Using Pitman-Yor Process", Jul. 25-28, 2010, KDD10, pp. 673-681.

Opinion Mining, Sentiment Analysis, and Opinion Spam Detection [online] [retrieved Jun. 11, 2015], Retrieved from the nternet: URL:http://www.cs.uic.edu/~liub/FBS/sentiment-analysis.html#lexicon. 8 pages.

Mameffe, M.C. et al., Stanford typed dependencies manual, [online][retrieved Dec. 14, 2015], Retrieved from the nternet: <URL: http://nlp.stanford.edu/software/dependencies_manual.pdf>. (Sep. 2008) 28 pages.

Das, S.R. et al., *Yahoo! for Amazon: Sentiment Extraction from Small Talk on the Web*, Management Science, (Jan. 5, 2006) pp. 1-30.

Gamon, M., *Sentiment Classification on Customer Feedback Data: Noisy Data, Large Feature Vectors, and the Role of Linguistic Analysis*, International Conference on Computational Linguistics, (2004) 7 pages.

Garcia, A. et al., *Defeasible Logic Programming an Argumentative Approach*, Theory and Practice of Logic Programming, (2004) [online][retrieved Dec. 14, 2015]. Retrieved from the internet: <URL: http://cs.uns.edu.ar/~ajg/papers/2004TPLPGarciaSimari.pdf> 95-137.

Glance, N. et al., *Deriving Marketing Intelligence from Online Discussion*, KDD '05, ACM, Chicago, Illinois, USA, (Aug. 21-24, 2005) 9 pages.

(56) References Cited

OTHER PUBLICATIONS

International Search Report and Written Opinion for corresponding International Application No. PCT/US09/43658 dated Jul. 14, 2009, 8 pages.
*Kango Announces Series A Funding and Private Beta Status*, Press Release. UpTake Networks, Inc., 2007, [Online] [Retrieved on Jun. 25, 2009] Retrieved from the internet<URL: http://www.uptake.com/documents/press/121807.pdf> 2 pages.
Marneffe, M.C. et al., *Stanford typed dependencies manual*, [online][retrieved Dec. 14, 2015]. Retrieved from the internet: <URL: http://nlp.Stanford.edu/software/dependencies_manual.pdf>. (Sep. 2008) 28 pages.
Notice of Allowance for corresponding U.S. Appl. No. 14/727,852 dated Dec. 16, 2015.
Office Action for corresponding U.S. Appl. No. 12/119,465 dated Apr. 4, 2013.
Office Action for corresponding U.S. Appl. No. 12/119,465 dated Aug. 24, 2011.
Office Action for corresponding U.S. Appl. No. 12/119,465 dated Dec. 30, 2010.
Office Action for corresponding U.S. Appl. No. 12/119,465 dated Jan. 8, 2014.
Office Action for corresponding U.S. Appl. No. 12/119,465 dated May 22, 2014.
Office Action for corresponding U.S. Appl. No. 12/119,465 dated Sep. 7, 2012.
Office Action for corresponding U.S. Appl. No. 14/727,852 dated Sep. 18, 2015.
Office Action for U.S. Appl. No. 15/073,486 dated Sep. 19, 2016.
*Opinion Mining, Sentiment Analysis, and Opinion Spam Detection* [online] [retrieved Jun. 11, 2015], Retrieved from the Internet: URL:http://www.cs.uic.edu/~liub/FBS/sentiment-analysis.html#lexicon. 8 pages.
Pang, B. et al., *Thumbs Up? Sentiment Classification Using Machine Learning Techniques*, in Proceedings of the Conference on Empirical Methods in Natural Language Processing (EMNLP) 2002, Philadelphia (Jul. 2002), 8 pages.
U.S. Appl. No. 61/922,786, filed Dec. 31, 2013.
*SentiWordNet* [online] [retrieved Jun. 11, 2015], Retrieved from the Internet: URL:http://sentiwordnet.isti.cnr.it/. 2 pages.
Shanahan, J. et al., *Computing Attitude and Affect in Text: Theory and Applications*, Springer, Dordrecht, Netherlands (2006) pp. 265-279.
U.S. Appl. No. 14/727,852, filed Jun. 1, 2015, In re: L'Huillier et al. entitled *Method and System for Programmatic Analysis of Consumer Reviews*.
U.S. Appl. No. 14/811,521, filed Jul. 28, 2015, In re: L'Huillier et al. entitled *System and Method for Programmatic Generation of Attribute Descriptors*.
U.S. Appl. No. 62/030,549, filed Jul. 29, 2014, In re: L'Huillier et al. entitled *Method and System for Programmatic Analysis of Consumer Reviews*.
U.S. Appl. No. 62/018,456, filed Jun. 27, 2014, In re: Landon et al. entitled *Method and System for Programmatic Generation of Survey Queries*.
U.S. Appl. No. 62/033,090, filed Aug. 4, 2014, In re: L'Huillier et al. entitled *System and Method for Programmatic Generation of Attribute Descriptors*.
Wiebe, J. et al., *Identifying Collocations for Recognizing Opinions*, in Proceedings of ACL/EACL '01 Workshop on Collocation, Toulouse, France (Jul. 2001) 8 pages.
U.S. Appl. No. 14/919,111, filed Oct. 21, 2015, In re: L'Huillier, entitled *Method and System for Programmatic Analysis of Consumer Sentiment With Regard to Attribute Descriptions*.
Sentence Patterns—The Writing Center, [online], [retrieved from the Internet Sep. 28, 2018] <URL: http://writingcenter.unc.edu/tips-and-tools/sentence-patterns/> 5 pages.
Patent Board Decision for U.S. Appl. No. 12/119,465 dated Dec. 5, 2016, 10 pages.

\* cited by examiner

METHOD AND SYSTEM FOR PROGRAMMATIC GENERATION OF SURVEY QUERIES

CROSS-REFERENCE TO RELATED APPLICATIONS

This application claims the benefit of U.S. Provisional Application No. 62/018,456, entitled "METHOD AND SYSTEM FOR PROGRAMMATIC GENERATION OF SURVEY QUERIES," and filed Jun. 27, 2014, the entire contents of which are hereby incorporated by reference.

TECHNOLOGICAL FIELD

Example embodiments of the present invention relate generally to survey generation, processing and management and, more particularly, to a computer-executable method, computer system and computer apparatus for programmatically generating survey queries or questions.

BACKGROUND

Certain commercial retailers provide survey queries to enable consumers to rate and review merchants and products. In this regard, areas for improving conventional techniques for providing survey queries have been identified and technical solutions have been implemented in exemplary embodiments.

BRIEF SUMMARY

In accordance with one exemplary embodiment, a computer-executable method is provided for programmatically generating one or more survey queries. The method includes: accessing information on a commercial entity or object; based on the accessed information, generating an attribute descriptor associated with the attribute; programmatically generating a survey query indicating the attribute descriptor; and transmitting one or more computer-executable instructions to a computing device to cause a visual display device to render a user interface, the user interface displaying the survey query and enabling user input in response to the survey query.

In accordance with another exemplary embodiment, a computer-executable method is provided for programmatically generating one or more survey queries. The method includes: accessing consumer information on a consumer; based on the consumer information, determining a commercial entity or object of relevance to the consumer; determining an attribute descriptor associated with the commercial entity or object; programmatically generating a survey query indicating the attribute descriptor; and transmitting one or more computer-executable instructions to a computing device associated with the consumer to cause a visual display device to render a user interface, the user interface displaying the survey query and enabling user input in response to the survey query.

In accordance with another exemplary embodiment, a computer-executable method is provided for programmatically generating one or more survey queries. The method includes: accessing consumer information on a consumer; based on the consumer information, determining a commercial entity or object of relevance to the consumer; accessing information on the commercial entity or object; based on the information on the commercial entity or object, generating an attribute descriptor associated with the attribute; programmatically generating a survey query indicating the attribute descriptor; and transmitting one or more computer-executable instructions to a computing device associated with the consumer to cause a visual display device to render a user interface, the user interface displaying the survey query and enabling user input in response to the survey query.

In accordance with another exemplary embodiment, one or more non-transitory computer-readable media are provided, having encoded thereon one or more computer-executable instructions that, when executed on a computing device, performs a computer-executable method for programmatically generating one or more survey queries. The method includes: accessing information on a commercial entity or object; based on the accessed information, programmatically generating an attribute descriptor associated with the attribute; programmatically generating a survey query indicating the attribute descriptor; and transmitting one or more computer-executable instructions to a computing device to cause a visual display device to render a user interface, the user interface displaying the survey query and enabling user input in response to the survey query.

In accordance with another exemplary embodiment, one or more non-transitory computer-readable media are provided, having encoded thereon one or more computer-executable instructions that, when executed on a computing device, performs a computer-executable method for programmatically generating one or more survey queries. The method includes: accessing consumer information on a consumer; based on the consumer information, determining a commercial entity or object of relevance to the consumer; determining an attribute descriptor associated with the commercial entity or object; programmatically generating a survey query indicating the attribute descriptor; and transmitting one or more computer-executable instructions to a computing device associated with the consumer to cause a visual display device to render a user interface, the user interface displaying the survey query and enabling user input in response to the survey query.

In accordance with another exemplary embodiment, one or more non-transitory computer-readable media are provided, having encoded thereon one or more computer-executable instructions that, when executed on a computing device, performs a computer-executable method for programmatically generating one or more survey queries. The method includes: accessing consumer information on a consumer; based on the consumer information, determining a commercial entity or object of relevance to the consumer; accessing information on the commercial entity or object; based on the information on the commercial entity or object, programmatically generating an attribute descriptor associated with the attribute; programmatically generating a survey query indicating the attribute descriptor; and transmitting one or more computer-executable instructions to a computing device associated with the consumer to cause a visual display device to render a user interface, the user interface displaying the survey query and enabling user input in response to the survey query.

In accordance with another exemplary embodiment, a computing system is provided. The computing system includes a processor configured for: accessing information on a commercial entity or object; based on the accessed information, programmatically generating an attribute descriptor associated with the attribute; programmatically generating a survey query indicating the attribute descriptor; and transmitting one or more computer-executable instructions to a computing device to cause a visual display device to render a user interface, the user interface displaying the survey query and enabling user input in response to the survey query.

In accordance with another exemplary embodiment, a computing system is provided. The computing system includes a processor configured for: accessing consumer information on a consumer; based on the consumer information, determining a commercial entity or object of relevance to the consumer; determining an attribute descriptor associated with the commercial entity or object; programmatically generating a survey query indicating the attribute descriptor; and transmitting one or more computer-executable instructions to a computing device associated with the consumer to cause a visual display device to render a user interface, the user interface displaying the survey query and enabling user input in response to the survey query.

In accordance with another exemplary embodiment, a computing system is provided. The computing system includes a processor configured for: accessing consumer information on a consumer; based on the consumer information, determining a commercial entity or object of relevance to the consumer; accessing information on the commercial entity or object; based on the information on the commercial entity or object, programmatically generating an attribute descriptor associated with the attribute; programmatically generating a survey query indicating the attribute descriptor; and transmitting one or more computer-executable instructions to a computing device associated with the consumer to cause a visual display device to render a user interface, the user interface displaying the survey query and enabling user input in response to the survey query.

In certain embodiments, in generating an attribute descriptor for a first commercial entity or object, information on the first commercial entity or object may be used (e.g., consumer reviews, ratings, information on products or services). In certain other embodiments, in generating an attribute descriptor for a first commercial entity or object, information on one or more additional commercial entities or objects may be used. In certain other embodiments, in generating an attribute descriptor for a first commercial entity or object, information on the first commercial entity or object and information on one or more additional commercial entities or objects may be used.

In certain cases, information on the first commercial entity or object may be compared to information on the additional entities or objects to determine whether information on the additional entities or objects is suitable for generating an attribute descriptor for the first entity or object. In one embodiment, certain profile data items of the entities or objects may be compared to determine if they match or overlap. For example, if two commercial entities are both Italian restaurants, then information (e.g., consumer reviews) on one entity may be used to generate an attribute descriptor for the other entity.

BRIEF DESCRIPTION OF THE DRAWINGS

The foregoing and other objects, aspects, features, and advantages of exemplary embodiments will become more apparent and may be better understood by referring to the following description taken in conjunction with the accompanying drawings.

Figure 1:
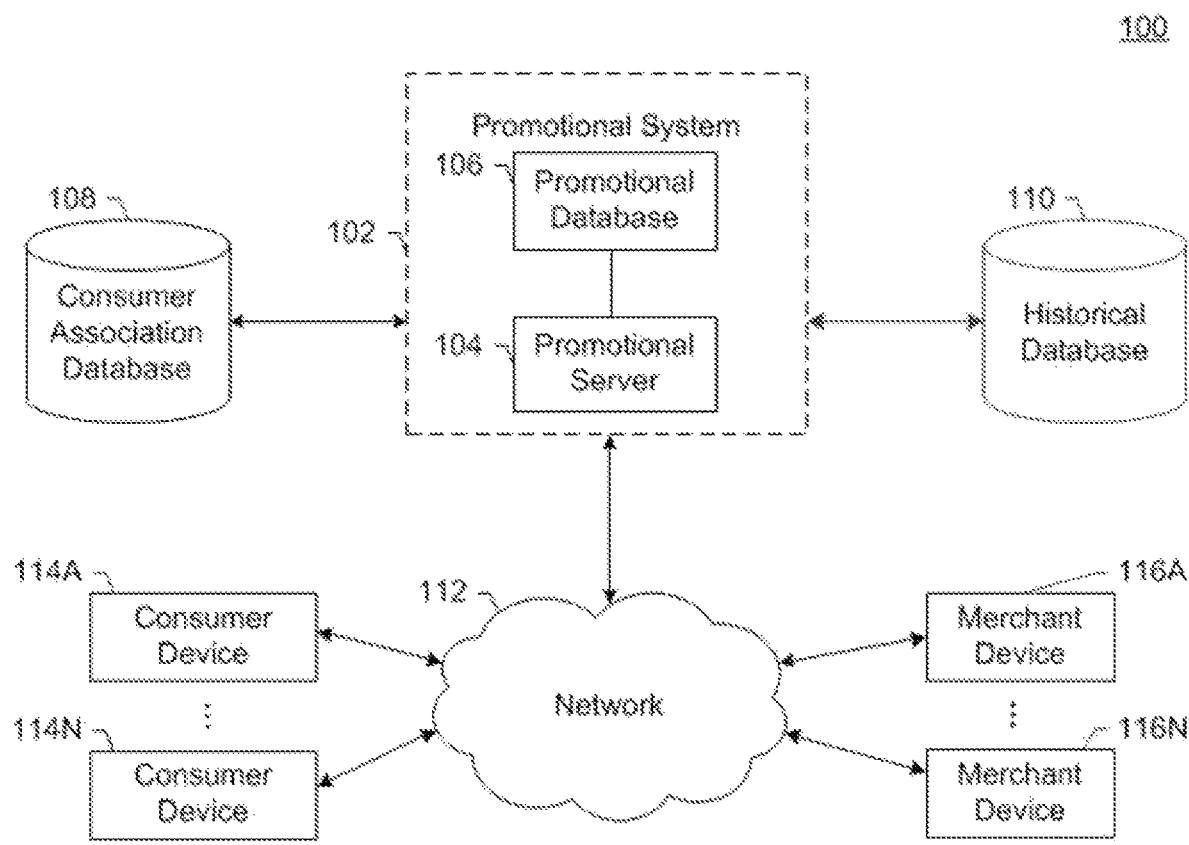
FIG. 1 is a block diagram illustrating an exemplary system within which exemplary embodiments may operate.

The accompanying drawings are not intended to be drawn to scale.

DETAILED DESCRIPTION

Exemplary embodiments provide computer systems, computer-executable methods and one or more non-transitory computer-readable media for programmatically generating one or more survey queries for enabling a consumer to quantitatively and/or qualitatively assess a commercial entity or object. Quantitative and/or qualitative assessments facilitate future consumers in making purchase decisions, but conventional assessment techniques suffer from numerous deficiencies. Certain conventional assessment techniques require a consumer to provide an overall rating for a merchant or product even though assigning an overall rating is often difficult. For example, a consumer may feel several positive and negative sentiments about an experience, and combining such sentiments into an overall rating is non-trivial. Additionally, certain conventional techniques do not enable normalization of ratings among consumers or even between qualitative and quantitative reviews of the same consumer. For example, there are often mismatches between the words on a review and a corresponding rating. Furthermore, reviews are long and difficult to produce and to read, which results in few consumers writing reviews or perusing them.

Exemplary embodiments address deficiencies in conventional assessment techniques by, for example, defining one or more attribute descriptors regarding a commercial entity or object. In some embodiments, an "attribute descriptor" may be a textual piece of data regarding the commercial entity or object. In certain cases, an attribute descriptor may provide a general or overall description or opinion on a commercial entity or object as a whole (e.g., general attribute descriptors "very good, "not bad," "bad purchase," "sucks," "total crap").

In certain cases, an attribute descriptor may provide a contextual description or opinion describing a contextual feature or attribute of a commercial entity or object. Exemplary contextual attribute descriptors may describe, for example, a setting (e.g., attribute descriptor "romantic" may describe a restaurant as having a romantic setting), a situation (e.g., attribute descriptor "poor service" may describe an undesirable situation faced by a consumer at a restaurant), a physical environment (e.g., attribute descriptor "loud music" may describe a restaurant as having loud music), hygiene, price level (e.g., attribute descriptor "dirt cheap" may describe an inexpensive merchant), a physical location (e.g., attribute descriptor "posh neighborhood" may indicate that a restaurant is in an expensive locale), and the like.

In certain cases, an attribute descriptor may indicate a quality associated with a commercial entity or object. Exemplary quality attribute descriptors may describe, for example, durability (e.g., attribute descriptor "rugged" may describe a durable pair of hiking boots), fragility (e.g., attribute descriptor "brittle"), size and/or weight (e.g., attribute descriptor "small and light"), cost effectiveness (e.g., attribute descriptor "value for money"), quality of customer service (e.g., attribute descriptor "friendly service" may indicate good customer service), performance (e.g., attribute descriptor "great performance!"), and the like.

In certain cases, an attribute descriptor may indicate an event or happening regarding a commercial entity or object. Exemplary event attribute descriptors may indicate, for example, whether a consumer would purchase a commercial object again (e.g., attribute descriptor "would buy again"), whether a consumer had to return a commercial object (e.g., attribute descriptor "returned it"), a consumer's specific experience (e.g., attribute descriptor "fails after 2 months"), and the like.

In certain cases, an attribute descriptor may broadly indicate a feature, categorization or sub-categorization of any feature of a commercial entity or object. Exemplary category or sub-category attribute descriptors may describe, for example, a subject matter associated with the commercial entity or object (e.g., attribute descriptor "outdoorsy" may describe an outdoor equipment retail store), a genre of a product (e.g., attribute descriptor "authentic Italian" or "freshest sushi ever" may describe a type of food sold by a restaurant), a feature or component of a commercial object (e.g., attribute descriptor "spicy as hell" may describe food that is spicy, attribute descriptor "good for gaming" may describe a laptop that has a fast processor and good graphics, attribute descriptor "best screen ever" may describe a laptop with a good quality screen), and the like.

In certain cases, an attribute descriptor may indicate a combination of two or more attributes of a commercial entity or object.

In certain embodiments, an attribute descriptor may have a predetermined maximum phrase, word or alphanumeric character length, e.g., 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, etc.

Certain attribute descriptors may be received, extracted or programmatically generated from consumer information provided by consumers regarding one or more commercial entities and objects, for example, from consumer reviews, ratings and survey responses. In certain non-limiting cases, the consumer information may be in the form of reviews that include structured or unstructured text. For structured text reviews, exemplary embodiments may programmatically generate attribute descriptors based on the names of the text fields (e.g., a text field titled "customer service" may be used to generate an attribute descriptor "customer service"). For unstructured text reviews, exemplary embodiments may programmatically generate attribute descriptors based on any suitable grammatical context detection techniques. In certain cases, machine learning may be applied to determine an attribute descriptor based on consumer information previously provided for a commercial entity or object.

In certain cases, the consumer information (e.g., reviews, ratings and survey responses) may be accessed from Internet websites using, for example, a web crawler. In certain cases, the consumer reviews, ratings and survey responses may be accessed from a database associated with a promotion and marketing service.

In certain embodiments, in generating an attribute descriptor for a first commercial entity or object, information on the first commercial entity or object may be used (e.g., consumer reviews, ratings, information on products or services). In certain other embodiments, in generating an attribute descriptor for a first commercial entity or object, information on one or more additional commercial entities or objects may be used. In certain other embodiments, in generating an attribute descriptor for a first commercial entity or object, information on the first commercial entity or object and information on one or more additional commercial entities or objects may be used.

In certain cases, information on the first commercial entity or object may be compared to information on the additional entities or objects to determine whether information on the additional entities or objects is suitable for generating an attribute descriptor for the first entity or object. In one embodiment, certain profile data items of the entities or objects may be compared to determine if they match or overlap. For example, if two commercial entities are both Italian restaurants, then information (e.g., consumer reviews) on one entity may be used to generate an attribute descriptor for the other entity.

In certain embodiments in which the commercial entity is a merchant, the information usable to determine an attribute descriptor may include one or more of: a type of the merchant (e.g., restaurant, retail store), a description of ambiance at a location associated with the merchant, information on a product or service offered by the merchant (e.g., food, sushi, tools), a description of a quality of a product or service offered by the merchant, a description of customer service associated with the merchant, consumer ratings or reviews of the merchant and/or of other merchants, and the like. One or more consumer ratings or reviews usable to determine an attribute descriptor may include one or more of: one or more quantitative ratings, one or more qualitative reviews, and the like. Information on the one or more products, product types, services or service types usable to determine an attribute descriptor may include one or more of: a category or sub-category of a product or service offered by the merchant, a price, a sentiment associated with the product or the service, an event or occasion associated with the product or service, a quality rating associated with the product or service, consumer ratings or reviews for the product or service, and the like.

In certain embodiments in which the commercial object is a product, service or promotion, the information usable to determine an attribute descriptor may include, but is not limited to, a type of the commercial object (e.g., food, hardware), a description of a merchant associated with the commercial object, a location of the merchant, a name of the merchant, one or more consumer ratings or reviews provided for the commercial object and/or for other commercial objects, a category or sub-category of the commercial object, a price of the commercial object, a sentiment associated with the commercial object, an event or occasion associated with the commercial object, a quality rating associated with the commercial object, and the like.

In certain embodiments, an attribute descriptor may be programmatically generated based on textual analysis of consumer information, but may not be directly extracted from the consumer information. For example, if a consumer review indicates that "Restaurant X had very hot food," embodiments may textually analyze the review to identify a feature "hot" and a quantifier "very" associated with the food at Restaurant X. Based on that textual analysis, embodiments may programmatically generate an attribute descriptor "spicy as hell" to indicate that very hot food may be sold at Restaurant X. The programmatic generation of the attribute descriptor may use any suitable textual analysis and generation technique, for example, by retrieving synonyms from a dictionary (e.g., "spicy" is a synonym for "hot"), using colloquial terms in place of other terms (e.g., "as hell" is indicative of a quantifier "very"), and the like. In certain cases, sentiments provided in the consumer information (e.g., "liked the spiciness" or "hated the hot food") and a quantifier (e.g., "really liked the spiciness" or "absolutely hated the hot food") may be used in programmatically generating an attribute descriptor.

In some cases, in generating an attribute descriptor, the ratings and/or reviews provided for by multiple consumers may be consolidated or combined. In one exemplary technique, one or more stop words may be removed from the consumer reviews, synonyms may be merged into a predetermined single word or phrase, and quantifiers may be standardized by being consolidated into a predetermined quantifier (e.g., "really," "very" and "super" may be consolidated into "great").

Embodiments may generate a survey query indicating an attribute descriptor and soliciting a rating or review of the attribute descriptor, and display a user interface including the survey query and a user input field for entering a qualitative and/or quantitative rating of the attribute descriptor for the merchant or product.

In certain embodiments, the user interface may be customized for each consumer so that one or more commercial entities or objects are programmatically selected for display for that particular consumer. For example, information on the commercial entity or object may be compared to information on the consumer to determine if the commercial entity or object is of relevance or interest to the consumer and, if so, display a survey query related to the commercial entity or object.

In certain embodiments, the user interface may be customized for each consumer so that one or more attribute descriptors are programmatically selected for display for that particular consumer. For example, one or more attribute descriptors may be programmatically generated for a commercial entity or object based on information on the commercial entity or object. In certain cases, an attribute descriptor may be selected for display to a particular consumer based on information on the consumer. For example, if information on a merchant indicates that it is a cheap restaurant and if consumer information indicates that the consumer has a low income or is frugal, then an attribute descriptor may be selected to indicate that the merchant may be a good value for money.

In certain embodiments, the user input field may enable a consumer to enter a quantitative rating for the attribute descriptor (e.g., a number of stars, a numerical rating). In certain embodiments, the user input field may enable a consumer to enter a sentiment associated with the attribute descriptor (e.g., positive, negative, neutral) and, in some cases, a quantifier associated with the sentiment (e.g., very, extremely). In certain embodiments, the user input field may enable a consumer to enter a textual review regarding the attribute descriptor displayed. In certain embodiments, the user input field may simply enable a consumer to select the attribute descriptor displayed to indicate that the user agrees with the attribute descriptor.

Certain embodiments facilitate consumers in providing responses to survey queries by, in some cases, enabling voting on attribute descriptors. For example, a survey query may display an attribute descriptor and enable a consumer to input one of two response options (e.g., hot or not, yes or no). Certain embodiments enable auto-completion of a review as a consumer inputs a review in the user input field. Certain embodiments enable a consumer to adopt a review or rating provided by a different consumer.

Certain embodiments may provide games to encourage and incentivize consumers to provide responses to survey queries.

In some embodiments, one or more attribute descriptors associated with a commercial entity or object may be displayed for a consumer. The top n number of attribute descriptors may be selected for display based on their ratings. Certain embodiments may provide different visualization options to provide rating or review information in a succinct and easy to view manner. For example, consumers may be allowed to quickly determine the ratio between the positive and negative ratings without having to read the attribute descriptors (e.g., by providing positive ratings in green font and negative ratings in red font and by varying the font size based on the magnitude of the ratings). Consumer may also be allowed to read individual reviews and ratings, and may be allowed to view the weights associated with the ratings. One exemplary visualization technique is a tag cloud in which each tag is an attribute descriptor and in which positive tags are provided in a first font color while negative tags are provided in a second font color and in which the font size varies with the rating for each attribute descriptor.

In some cases, a consumer may be allowed to adjust the display of attribute descriptors associated with a commercial entity or object, for example, based on relevance or interest to the consumer, based on whether the attribute descriptor is spam, and the like.

I. Definitions of Terms

Certain terms used in connection with exemplary embodiments are defined below.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and is operable to provide example promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "merchant" may include, but is not limited to, a business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. One example merchant may be a running company that sells attire for use by a person who runs or participates in athletic activities.

As used herein, the term "consumer" may include, but is not limited to, a client, customer, purchaser, shopper, user, or the like, who may be in the position to or does exchange value for one or more vouchers under the terms defined by one or promotions. For example, and using the aforementioned running company as the example provider, a consumer may be an individual who is interested in purchasing running shoes.

As used herein, the term "commercial entity" may include any commercial actor including, but not limited to, an individual, a consumer, a buyer, a seller, a group of individuals, a company, a retailer, a wholesaler, a service provider, a promotion and marketing service, and the like.

As used herein, the term "commercial object" may include any good, service or promotion that may be purchased or sold.

As used herein, the term "consumer interface" may include any digitally rendered user interface displayed on a visual display device for enabling a consumer to interface with a promotion and marketing service. An exemplary consumer interface may enable a consumer to view one or more promotions, purchase one or more promotions, share one or more promotions with other consumers, receive messages and/or promotions from other consumers, receive messages from the promotion and marketing service, and the like. Exemplary consumer interfaces may be rendered in any desired form including, but not limited to, as a mobile application for display on a mobile computing device (e.g., a smartphone), a webpage or website for display on a mobile or non-mobile computing device via the Internet, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. Using the running company promotion as an example, the accepted value is $25 and the promotional value is $50. In this example, the residual value may be equal to the accepted value.

As used herein, the term "promotion score" refers to a programmatically generated quantitative or qualitative score or indication of the expected effectiveness of providing an impression of a promotion to a consumer. In some embodiments, the expected effectiveness may be indicated by a predicted probability or likelihood that the consumer will purchase the promotion offered by an impression.

As used herein, the term "impression" may include a communication, a display, or other perceived indication, such as a flyer, print media, e-mail, text message, application alert, mobile applications, mobile notifications, other type of electronic interface or distribution channel and/or the like, of one or more promotions. For example, and using the aforementioned running company as the example provider, an e-mail communication sent to consumers that indicates the availability of a promotion of $25 for $50 toward running shoes.

As used herein, the term "voucher" may include, but is not limited to, any type of gift card, tender, electronic certificate, medium of exchange, or the like, that embodies the terms of the promotion from which it results and which may be used toward at least a portion of the purchase, acquisition, procurement, consumption, or the like, of goods, services and/or experiences. In some examples, a voucher may take the form of tender that has a given value that is exchangeable for goods, services and/or experiences and/or a reduction in a purchase price of a particular good, service or experience. In some examples, the voucher may have multiple values, such as an accepted value, a promotional value and/or a residual value. For example, using the aforementioned running company as the example provider, a voucher may comprise an electronic indication in a mobile application that shows $50 of value to spend at the running company. In some examples, the accepted value of the voucher is defined by the value exchanged for the voucher. In some examples, the promotional value of the voucher is defined by the promotion from which the voucher resulted and is the value of the voucher beyond the accepted value. In some examples, the residual value of the voucher is the value after redemption, the value after the expiry or other violation of a redemption parameter, the return or exchange value of the voucher, or the like.

As used herein, the term "redemption" may include the use, exchange or other presentation of a voucher for at least a portion of a good, service or experience as defined by the voucher and its related offer. In some examples, redemption includes the verification of validity of the voucher. In other example embodiments, redemption may include an indication that a particular voucher has been redeemed and thus no longer retains an actual, promotional and/or residual value (e.g., full redemption). In other example embodiments, redemption may include the redemption of at least a portion of a voucher's actual, promotional and/or residual value (e.g., partial redemption). An example of redemption, using the aforementioned running company as the example provider, is exchanging a $50 voucher and $50 for a $100 pair of running shoes.

As used herein, the term "survey" refers to any suitable methodology for receiving a qualitative and/or quantitative assessment of a commercial entity or object.

As used herein, the term "survey query" refers to a solicitation to a consumer to provide a qualitative and/or quantitative assessment of a commercial entity or object.

As used herein, the term "interest indication" refers to an indication generated by a consumer in relation to a promotion, the interest indication indicating one or more of: purchase of the promotion by the consumer, viewing of the promotion by the consumer, rating of the promoting by the consumer, any activity performed by the consumer indicating a willingness to purchase the promotion (e.g., by adding it to a wish-list, by adding it to a favorites list), and the like.

As used herein, the terms "mobile computing device" and "mobile device" refer to any computing or communication device that is portable and is transported in normal usage (e.g., the iPhone™ mobile communication device, the Android™ mobile communication device, and the like), and that is capable of communication and that has sufficient processor power and memory capacity to perform the operations described herein. For example, and without limitation, a mobile computing device may include a smartphone, a table computer, a laptop computer, and the like.

As used herein, the terms "application program," "mobile application" and "mobile app" refer to computer-executable application software programmed or configured to run on a processing unit of a mobile computing device.

As used herein, the term "promotion application program" refers to an application program programmed or configured to run on a processing unit of a mobile computing device in order to enable a user of the computing device to use a promotion and marketing service. An exemplary promotion application program may be in constant or periodic communication with a remote computing device or server run by the promotion and marketing service to provide computer-executable functionality to the mobile computing device. An exemplary promotion application program may, for example, provide a user interface configured to render impressions of one or more promotions, receive user input selecting one or more impressions, and enable purchase of the promotions in response to user input.

As used herein, the term "module," encompasses hardware, software and/or firmware configured to perform one or more particular functions.

As used herein, the term "computer-readable medium" refers to a non-transitory storage hardware, non-transitory storage device or non-transitory computer system memory that may be accessed by a controller, a microcontroller, a computational system or a module of a computational system to encode thereon computer-executable instructions or software programs. The "computer-readable medium" may be accessed by a computational system or a module of a computational system to retrieve and/or execute the computer-executable instructions or software programs encoded on the medium. The non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM) and the like.

As used herein, the term "set" refers to a collection of one or more items.

As used herein, the term "plurality" refers to two or more items.

As used herein, the terms "equal" and "substantially equal" refer interchangeably, in a broad lay sense, to exact equality or approximate equality within some tolerance.

As used herein, the terms "similar" and "substantially similar" refer interchangeably, in a broad lay sense, to exact sameness or approximate similarity within some tolerance.

As used herein, the terms "couple," "coupled" and "coupling" refer to a direct or indirect connection among two or more components. For example, a first component may be coupled to a second component directly or through one or more intermediate components.

II. Exemplary Embodiments

Some exemplary embodiments of the present invention will now be described more fully hereinafter with reference to the accompanying drawings in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Although certain embodiments are described herein with reference to promotions and a promotion and marketing service, certain other embodiments are not thusly limited and may be implemented generally and without specific reference to promotions to a promotion and marketing service.

FIG. 1 is a block diagram illustrating an exemplary system within which exemplary embodiments may operate. An exemplary promotion and marketing service 100 may manage a promotional system 102 for managing the offer, purchase, and redemption of a set of promotions. Consumers and merchants may access the promotional system 102 via a network 112 (such as the Internet, or the like) using computer devices 114A through 114N and 116A through 116N, respectively. The promotional system 102 may include a promotional server 104 in communication with a promotional database 106 that stores the set of promotions managed by the promotion and marketing service. The promotion system 102 may have access to a merchant database or any suitable data storage structure 108 storing information on one or more merchants, one or more products offered by a merchant, one or more services offered by a merchant, and the like. The promotional system 102 may have access to a historical database or any suitable data storage structure 110 storing information regarding one or more of: promotions and impressions previously distributed to consumers, consumer profile data, prior activities performed by consumers with respect to promotions and impressions, prior activities performed by consumers with respect to commercial entities or objects, and the like. In various embodiments, promotional database 106, merchant database 108 and historical database 110 may be distinct databases, or may alternatively refer to a single database. In certain embodiments, merchant database 108 and historical database 110 may be provided independently of a promotional system 102.

Figure 2:
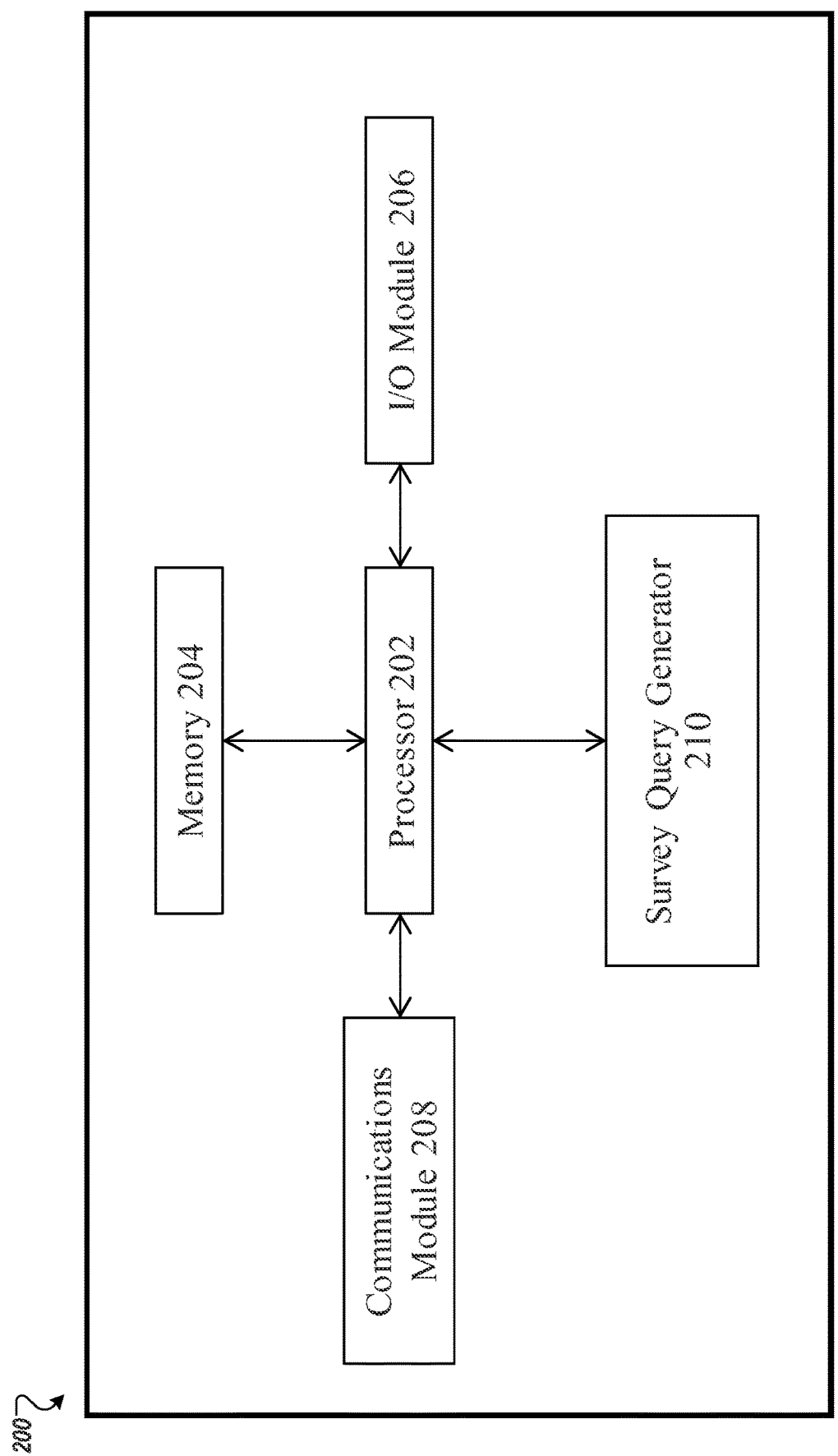
FIG. 2 is a block diagram illustrating exemplary modules of a computing device for use in a promotional server in accordance with certain exemplary embodiments.

The promotional server 104 may be embodied by a computing system, such as apparatus 200 shown in FIG. 2. As illustrated in FIG. 2, the apparatus 200 may include a computer processor or computer processing module 202, a memory 204, an input/output module 206, and a communications module 208.

In some embodiments, the apparatus 200 may include a survey query generator 210 programmed or configured to programmatically generate one or more survey queries with respect to a commercial entity or object for a consumer.

In some embodiments, the processor 202 (and/or co-processor or any other processing circuitry assisting or otherwise associated with the processor) may be in communication with the memory 204 via a bus for transmitting information among components of the apparatus. The memory 204 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 202 may be embodied in a number of different ways and may, for example, include one or more processing devices configured to perform independently. Additionally or alternatively, the processor 202 may include one or more processors configured in tandem via a bus to enable independent execution of instructions, pipelining, and/or multithreading.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include an input/output module 206 that may, in turn, be in communication with processor 202 to provide output to the user and, in some embodiments, to receive an indication of a user input. The input/output module may comprise a user interface and may include a display. In such embodiments, the user interface may comprise a web user interface, a mobile application, a client device, a kiosk, or the like. In some embodiments, the input/output module 206 may also include a keyboard, a mouse, a touch screen, touch areas, soft keys, a microphone, a speaker, or other input/output mechanisms. The processor, or user interface circuitry including the processor, may be configured to control one or more functions of one or more user interface elements through computer program instructions (e.g., software and/or firmware) stored on a memory accessible to the processor (e.g., memory 204, onboard memory of the processor, and/or the like).

Meanwhile, the communications module 208 may be any means such as a device or circuitry embodied in either hardware or a combination of hardware and software that is configured to receive and/or transmit data from/to a network and/or any other device or module in communication with the apparatus 200. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

In one embodiment, a consumer or merchant may use the apparatus 200 (e.g., as a kiosk) to communicate with the promotional system 102 to view promotion information or interact with promotions. However, in some embodiments of the present invention, the consumer or merchant may perform these functions from outside of the promotional system 102 using, for example, an end-user device, such as consumer device 114 or merchant device 116.

Figure 3:
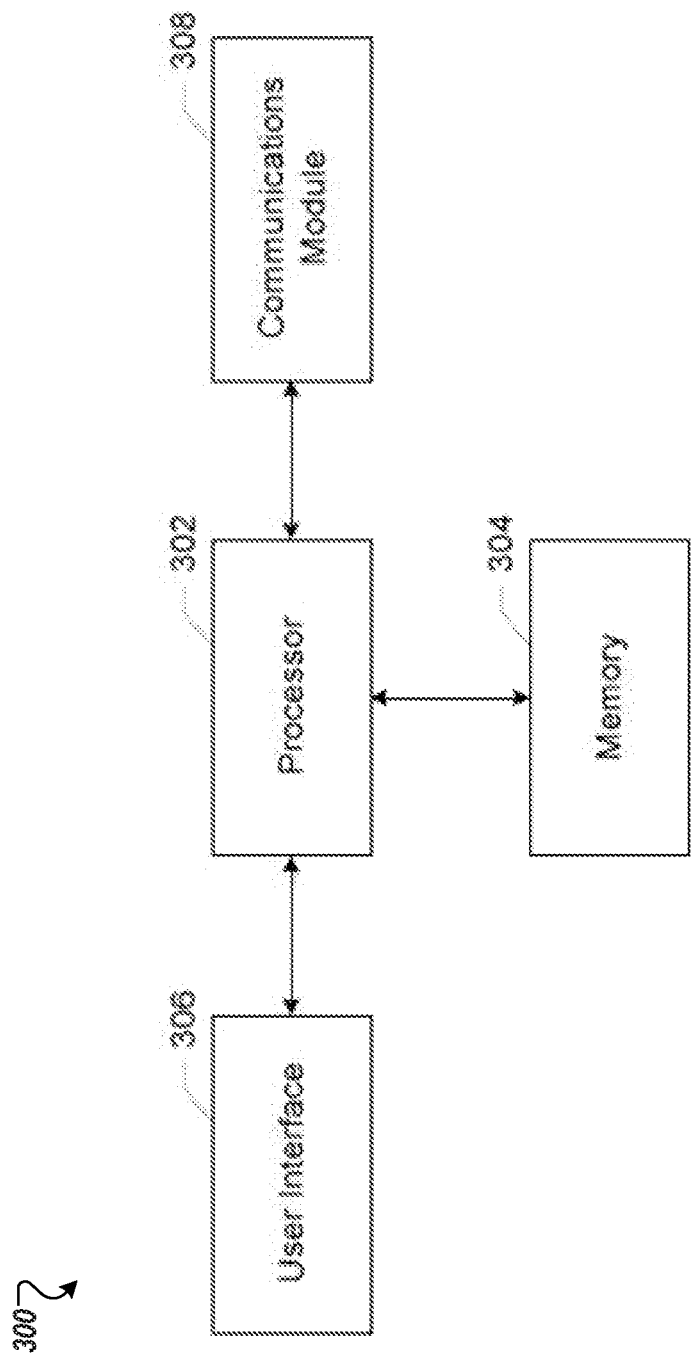
FIG. 3 is a block diagram illustrating exemplary modules of a computing device for use by a consumer or merchant in accordance with an exemplary embodiment.

Referring now to FIG. 3, a block diagram is illustrated showing an example end-user device, apparatus 300, that may be configured to enable a user to view promotions from outside the promotional system 102, in accordance with embodiments of the present invention. In FIG. 3, the apparatus 300, which may embody consumer device 114 or merchant device 116, may include or otherwise be in communication with a processor 302, a memory 304, a communications module 308, and a user interface 306. In some embodiments, the processor (and/or co-processor or any other processing circuitry assisting or otherwise associated with the processor) may be in communication with the memory 304 via a bus for passing information among components of the apparatus. The memory 304 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 302 may be embodied in a number of different ways and may, for example, include one or more processing devices configured to perform independently. Additionally or alternatively, the processor may include one or more processors configured in tandem via a bus to enable independent execution of instructions, pipelining, and/or multithreading.

In an example embodiment, the processor 302 may be configured to execute instructions stored in the memory 304 or otherwise accessible to the processor. Alternatively or additionally, the processor may be configured to execute hard-coded functionality. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions, the instructions may specifically configure the processor 302 to perform the algorithms and/or operations described herein when the instructions are executed.

In some embodiments, the apparatus 300 may include a user interface 306 that may, in turn, be in communication with processor 302 to provide output to the user and, in some embodiments, to receive an indication of a user input. As such, the user interface 306 may include a display and may comprise a web user interface, a mobile application, a client device, a kiosk, or the like. In some embodiments, the user interface 306 may also include a keyboard, a mouse, a touch screen, touch areas, soft keys, a microphone, a speaker, or other input/output mechanisms. The processor 302, or user interface circuitry comprising the processor 302, may be configured to control one or more functions of one or more user interface elements through computer program instructions (e.g., software and/or firmware) stored on a memory accessible to the processor (e.g., memory 304, and/or the like).

Meanwhile, the communications module 308 may be any means such as a device or circuitry embodied in either hardware or a combination of hardware and software that is configured to receive and/or transmit data from/to a network and/or any other device or module in communication with the apparatus 300 (e.g., promotional server 104 or, more generally, promotional system 102, other consumer devices 114 or merchant devices 116, or the like). In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

Figure 4:
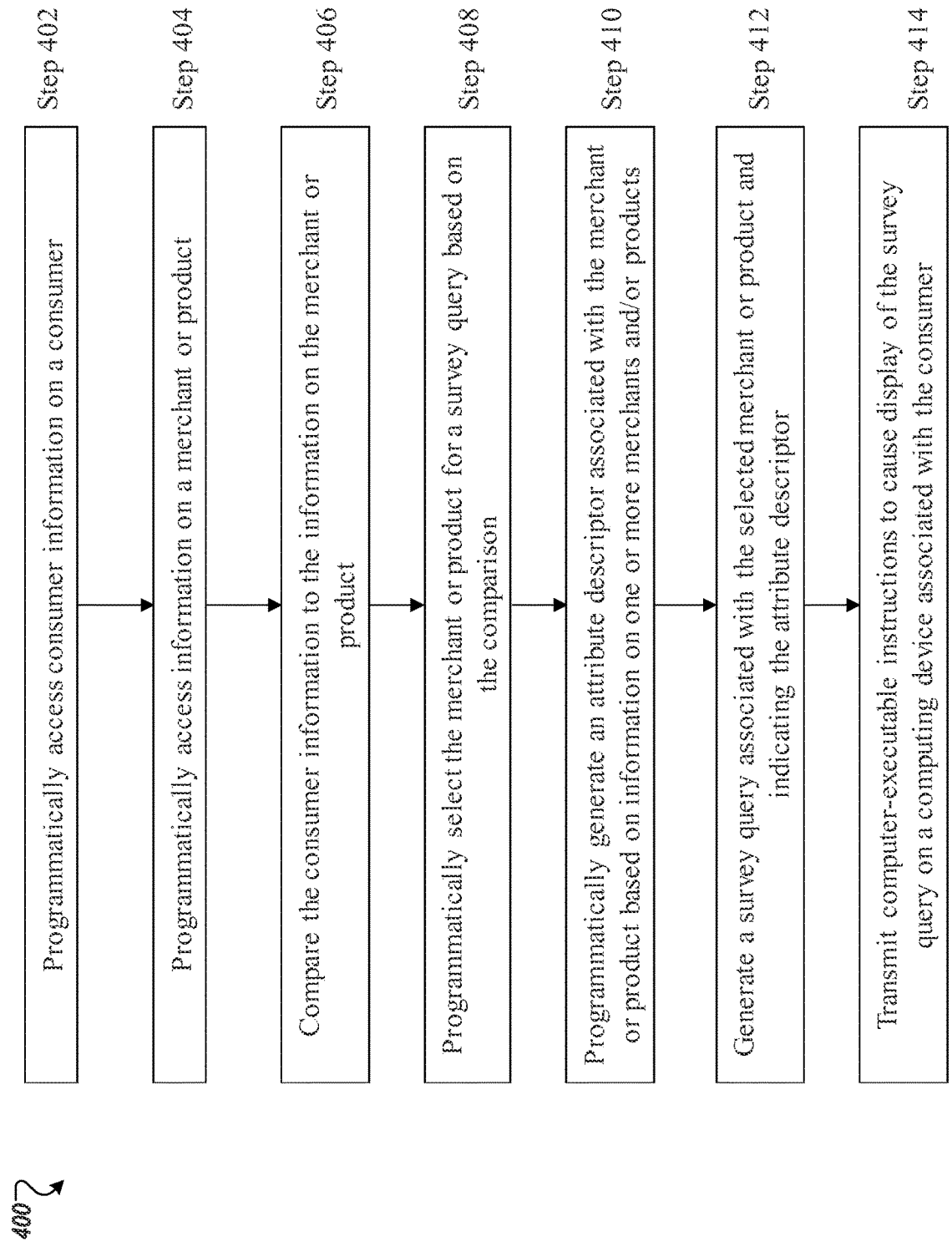
FIGS. 4-7 are flowcharts illustrating exemplary computer-executable methods for generating a survey query for soliciting a consumer rating and/or review of a commercial entity or commercial object.

FIG. 4 is a flowchart illustrating an exemplary computer-executable method 400 for generating a survey query for soliciting a consumer rating and/or review of a commercial entity or commercial object. In this exemplary method, information on a particular consumer may be used to programmatically select a commercial entity or object that is suitable for rating and/or review by that particular consumer. For example, a commercial entity or object may be selected so that information on the consumer indicates that the commercial entity or object may be of interest or relevance to the consumer.

In step 402, consumer information associated with a consumer may be programmatically accessed, for example, from historical database 110. In certain embodiments, the consumer information may include one or more profile data items on the consumer and/or data on one or more prior activities performed by the consumer. The profile data items may include, but are not limited to, an identification of the consumer, an age of the consumer, a gender of the consumer, a race of the consumer, an income of the consumer, a location associated with the consumer (e.g., a residential location, a work location), a merchant preference of the consumer, a category or sub-category of interest to the consumer, a product preference of the consumer, a price preference of the consumer, and the like. The prior activities may include, but are not limited to, one or more purchase activities, one or more product or merchant viewing activities, one or more product or merchant rating activities, one or more promotion viewing activities, one or more promotion rating activities, and the like.

In step 404, information on one or more commercial entities or objects may be accessed, for example, from merchant database 108 and/or from the Internet.

In certain embodiments in which the commercial entity is a merchant, the information accessed in step 404 may include, but is not limited to, a description of the merchant, a location of the merchant, a name of the merchant, one or more prior activities of the merchant, information on one or more products or product types offered by the merchant, information on one or more services or service types offered by the merchant, information on one or more promotions offered by the merchant, price information associated with the merchant, or one or more consumer ratings or reviews provided for the merchant. A description of a merchant usable in step 404 may include one or more of: a description of ambiance at a location associated with the merchant, a description of a quality of a product or service offered by the merchant, or a description of customer service associated with the merchant. One or more consumer ratings or reviews usable in step 404 may include one or more of: one or more quantitative ratings, or one or more qualitative reviews. Information on the one or more products, product types, services or service types usable in step 404 may include one or more of: a category or sub-category of a product or service offered by the merchant, a price, a sentiment associated with the product or the service, an event or occasion associated with the product or service, or a quality rating associated with the product or service.

In certain embodiments in which the commercial object is a product, service or promotion, the information accessed in step 404 may include, but is not limited to, a description of a merchant associated with the commercial object, a location of the merchant, a name of the merchant, one or more consumer ratings or reviews provided for the commercial object, a category or sub-category of the commercial object, a price of the commercial object, a sentiment associated with the commercial object, an event or occasion associated with the commercial object, a quality rating associated with the commercial object, and the like.

In step 406, the consumer information accessed in step 402 may be programmatically compared or otherwise analyzed relative to the information on the commercial entity or object accessed in step 404.

In step 408, the comparison may be used to programmatically select a particular commercial entity or commercial object that is of relevance or interest to a particular consumer and for which a survey query may be transmitted to the consumer. The commercial entity or object may be selected for programmatically generating a survey query for transmission to the particular consumer. In certain non-limiting examples, the consumer information used in steps 406 and 408 may not indicate that the consumer purchased the commercial object or purchased something at the commercial entity. As one example, if merchant information accessed in step 404 indicates that it is a provider of outdoor supplies and if consumer information accessed in step 402 indicates that a consumer is interested in outdoor activities and resides near the merchant, then comparison of the merchant and consumer information may be used to determine that the merchant may be of interest or relevance to the consumer. As another example, if merchant information accessed in step 404 indicates that it is in the vicinity of a consumer's residential location, then the comparison of the merchant and consumer information may be used to determine that the merchant may be of interest or relevance to the consumer. In this manner, the consumer may be enabled to rate or review one or more merchants in his/her local neighborhood.

In step 410, an attribute descriptor associated with the commercial entity or object selected in step 408 may be programmatically generated. In certain embodiments, information on the commercial entity or object accessed in step 404 may be used to generate the attribute descriptor. Types of information that may be used in step 410 are described with reference to step 404. For example, if past consumer reviews (for example, accessed online) indicate that a merchant is a restaurant that is popular for romantic dates, then an attribute descriptor may indicate that the merchant may be "romantic."

In certain other embodiments, information on one or more different commercial entities or objects may be used to generate the attribute descriptor for the commercial entity or object identified in step 404. Types of information that may be used in step 410 are described with reference to step 404. For example, if past consumer reviews (for example, accessed online) indicate that Restaurant X in an Italian neighborhood is popular for pasta, then an attribute descriptor for Restaurant Y (identified in step 404) in the same neighborhood may indicate Italian food or pasta.

In certain other embodiments, in generating an attribute descriptor for a first commercial entity or object (identified in step 404), information on the first commercial entity or object and information on one or more additional entities or objects may be used.

In certain cases, in step 404, information on the first commercial entity or object may be compared to information on the additional entities or objects to determine whether information on the additional entities or objects is suitable for generating an attribute descriptor for the first entity or object. In one embodiment, certain profile data items of the entities or objects may be compared to determine if they match or overlap. For example, if two commercial entities are both Italian restaurants, then information (e.g., consumer reviews) on one entity may be used to generate an attribute descriptor for the other entity.

In certain embodiments, in step 404, an attribute descriptor may be programmatically generated based on textual analysis of consumer information associated with one or more commercial entities or objects, but may not be directly extracted from the consumer information. For example, if a consumer review indicates that "Restaurant X had very hot food," embodiments may textually analyze the review to identify a feature "hot" and a quantifier "very" associated with the food at Restaurant X. Based on that textual analysis, embodiments may programmatically generate an attribute descriptor "spicy as hell" to indicate that very hot food may be sold at Restaurant X. The programmatic generation of the attribute descriptor may use any suitable textual analysis and generation technique, for example, by retrieving synonyms from a dictionary (e.g., "spicy" is a synonym for "hot"), using colloquial terms in place of other terms (e.g., "as hell" is indicative of a quantifier "very"), and the like. In certain cases, sentiments provided in the consumer information (e.g., "liked the spiciness" or "hated the hot food") and a quantifier (e.g., "really liked the spiciness" or "absolutely hated the hot food") may be used in programmatically generating an attribute descriptor.

In some cases, in generating an attribute descriptor, the ratings and/or reviews provided for by multiple consumers may be consolidated or combined. In one exemplary technique, one or more stop words may be removed from the consumer reviews, synonyms may be merged into a predetermined single word or phrase, and quantifiers may be standardized by being consolidated into a predetermined quantifier (e.g., "really," "very" and "super" may be consolidated into "great").

In step 412, a survey query may be programmatically generated associated with the commercial entity or object selected in step 408 and indicating the attribute descriptor determined in step 410. In the above-referenced example, the survey query may ask the consumer: "Is Restaurant X good for a romantic dinner?"

In step 414, one or more computer-executable instructions may be transmitted to a computing device associated with the consumer. The instructions may be configured so that they cause a visual display device associated with the computing device to render a user interface, the user interface displaying the survey query and a user input field to enable the consumer to respond to the survey query.

In certain embodiments, the user input field may enable a consumer to enter a quantitative rating for the attribute descriptor (e.g., a number of stars, a numerical rating). In certain embodiments, the user input field may enable a consumer to enter a sentiment associated with the attribute descriptor (e.g., positive, negative, neutral) and, in some cases, a quantifier associated with the sentiment (e.g., very, extremely). In certain embodiments, the user input field may enable a consumer to enter a textual review regarding the attribute descriptor displayed. In certain embodiments, the user input field may simply enable a consumer to select the attribute descriptor displayed to indicate that the user agrees with the attribute descriptor.

Certain embodiments facilitate consumers in providing responses to survey queries by, in some cases, enabling voting on attribute descriptors. For example, a survey query may display an attribute descriptor and enable a consumer to input one of two response options (e.g., hot or not, yes or no). Certain embodiments enable auto-completion of a review as a consumer inputs a review in the user input field. Certain embodiments enable a consumer to adopt a review or rating provided by a different consumer.

In some cases, the user interface may be part of a game implemented to encourage consumer response to survey queries. The consumer response may be in the form of a quantitative and/or qualitative review, a quantitative and/or qualitative rating, a textual description and/or review, an action in a game, and the like.

In certain non-limiting embodiments, the survey query may be transmitted to the consumer only if the attribute descriptor and/or the commercial entity/object are determined to be of relevance or interest to the consumer. This may be determined by comparing the attribute description to the consumer information and/or by comparing the consumer entity/object information to the consumer information.

In certain embodiments, the response provided by the consumer may be used to generate a score indicating a relevance of a particular commercial entity or object to the consumer. The score may be used to recommend the commercial entity or object to the consumer.

Figure 5:
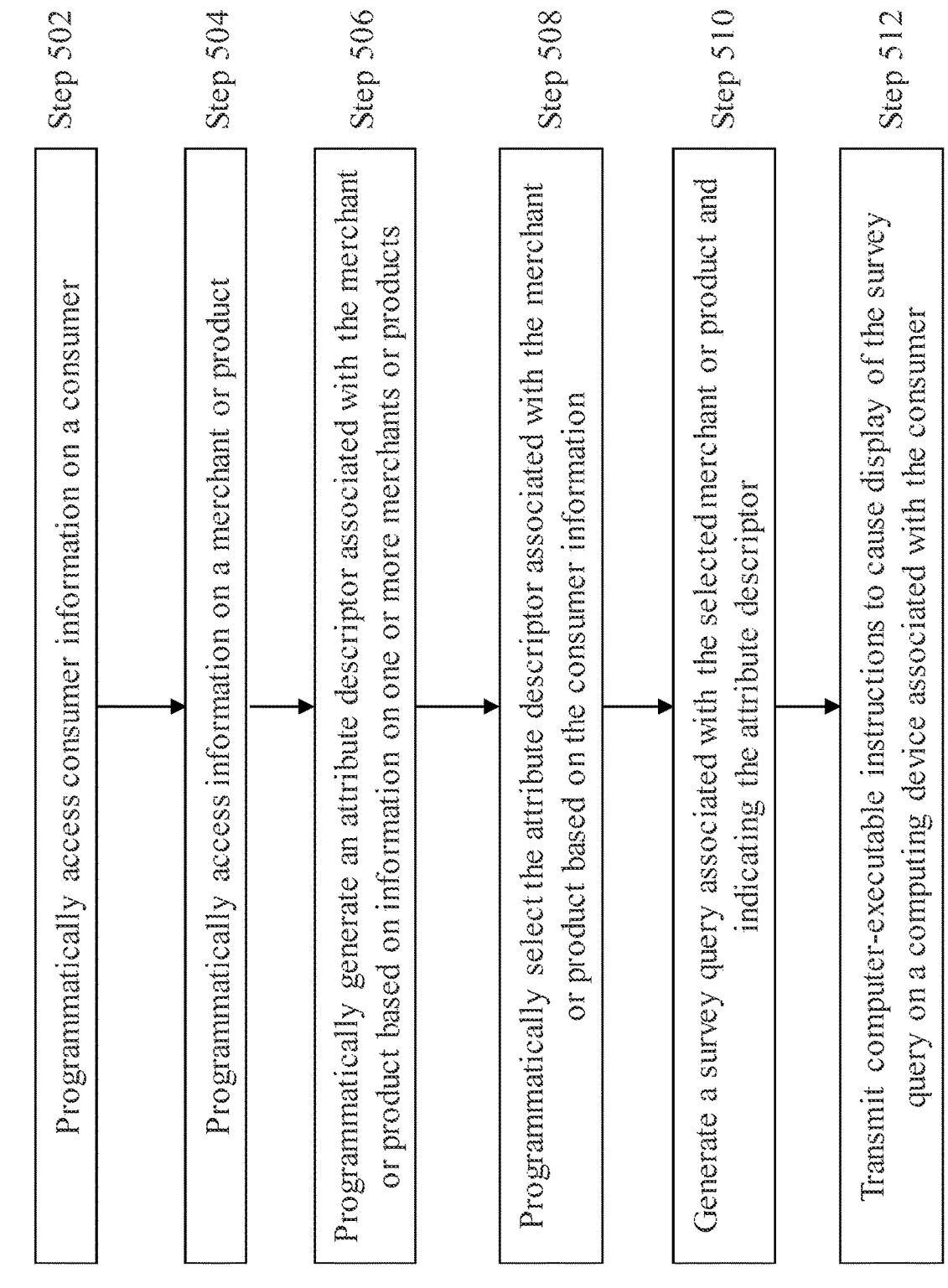

FIG. 5 is a flowchart illustrating an exemplary computer-executable method 500 for generating a survey query for soliciting a consumer rating and/or review of a commercial entity or commercial object. In this exemplary method, information on a consumer may be used to programmatically select an attribute descriptor that is suitable for rating and/or review by a particular consumer. For example, an attribute descriptor may be selected so that information on the consumer indicates that the attribute descriptor may be of interest or relevance to the consumer.

In step 502, consumer information associated with a consumer may be programmatically accessed, for example, from historical database 110. In certain embodiments, the consumer information may include one or more profile data items on the consumer and/or data on one or more prior activities performed by the consumer. The profile data items may include, but are not limited to, an identification of the consumer, an age of the consumer, a gender of the consumer, a race of the consumer, an income of the consumer, a location associated with the consumer (e.g., a residential location, a work location), a merchant preference of the consumer, a category or sub-category of interest to the consumer, a product preference of the consumer, a price preference of the consumer, and the like. The prior activities may include, but are not limited to, one or more purchase activities, one or more product or merchant viewing activities, one or more product or merchant rating activities, one or more promotion viewing activities, one or more promotion rating activities, and the like.

In step 504, information on a commercial entity or object may be accessed, for example, from merchant database 108 and/or from the Internet.

In certain embodiments in which the commercial entity is a merchant, the information accessed in step 504 may include, but is not limited to, a description of the merchant, a location of the merchant, a name of the merchant, one or more prior activities of the merchant, information on one or more products or product types offered by the merchant, information on one or more services or service types offered by the merchant, information on one or more promotions offered by the merchant, price information associated with the merchant, or one or more consumer ratings or reviews provided for the merchant. A description of a merchant usable in step 504 may include one or more of: a description of ambiance at a location associated with the merchant, a description of a quality of a product or service offered by the merchant, or a description of customer service associated with the merchant. One or more consumer ratings or reviews usable in step 504 may include one or more of: one or more quantitative ratings, or one or more qualitative reviews. Information on the one or more products, product types, services or service types usable in step 504 may include one or more of: a category or sub-category of a product or service offered by the merchant, a price, a sentiment associated with the product or the service, an event or occasion associated with the product or service, or a quality rating associated with the product or service.

In certain embodiments in which the commercial object is a product, service or promotion, the information accessed in step 504 may include, but is not limited to, a description of a merchant associated with the commercial object, a location of the merchant, a name of the merchant, one or more consumer ratings or reviews provided for the commercial object, a category or sub-category of the commercial object, a price of the commercial object, a sentiment associated with the commercial object, an event or occasion associated with the commercial object, a quality rating associated with the commercial object, and the like.

In step 506, an attribute descriptor for the commercial entity or object identified in step 504 may be programmatically generated based on information (e.g., consumer information, reviews, ratings) on one or more commercial entities or objects. In certain embodiments, information on one or more different commercial entities or objects may be used to generate the attribute descriptor for the commercial entity or object identified in step 506. Types of information that may be used in step 506 are described with reference to step 404 of FIG. 4. For example, if past consumer reviews (for example, accessed online) indicate that Restaurant X in an Italian neighborhood is popular for pasta, then an attribute descriptor for Restaurant Y (identified in step 504) in the same neighborhood may indicate Italian food or pasta.

In certain other embodiments, in generating an attribute descriptor for a first commercial entity or object (identified in step 504), information on the first commercial entity or object and information on one or more additional entities or objects may be used.

In certain cases, in step 506, information on the first commercial entity or object may be compared to information on the additional entities or objects to determine whether information on the additional entities or objects is suitable for generating an attribute descriptor for the first entity or object. In one embodiment, certain profile data items of the entities or objects may be compared to determine if they match or overlap. For example, if two commercial entities are both Italian restaurants, then information (e.g., consumer reviews) on one entity may be used to generate an attribute descriptor for the other entity.

In step 508, an attribute descriptor may be programmatically selected for display to the particular consumer based on consumer information accessed in step 502. Exemplary types of consumer information usable in step 508 are described with reference to step 502. As one example, if the consumer information indicates that the consumer has a low income or is frugal, then an attribute descriptor "value for money" may be selected for generation of a survey query for the consumer. As another example, if the consumer information indicates that the consumer has made prior purchases at Japanese restaurants, then an attribute descriptor "freshest sushi ever" may be selected for generation of a survey query for the consumer.

In step 510, a survey query may be programmatically generated associated with the commercial entity or object and indicating the attribute descriptor determined in step 506. In the above-referenced example, the survey query may ask the consumer: "Does Restaurant X have the freshest sushi ever?"

In step 512, one or more computer-executable instructions may be transmitted to a computing device associated with the consumer. The instructions may be configured so that they cause a visual display device associated with the computing device to render a user interface, the user interface displaying the survey query and a user input field to enable the consumer to respond to the survey query. The response may be in the form of a quantitative and/or qualitative review, a quantitative and/or qualitative rating, a textual description and/or review, and the like.

In certain cases, the survey query may be transmitted to the consumer only if the attribute descriptor and/or the commercial entity/attribute are determined to be of relevance or interest to the consumer. This may be determined by comparing the attribute description to the consumer information and/or by comparing the commercial entity/object information to the consumer information.

In certain embodiments, the response provided by the consumer may be used to generate a score indicating a relevance of a particular commercial entity or object to the consumer. The score may be used to recommend the commercial entity or object to the consumer.

Figure 6:
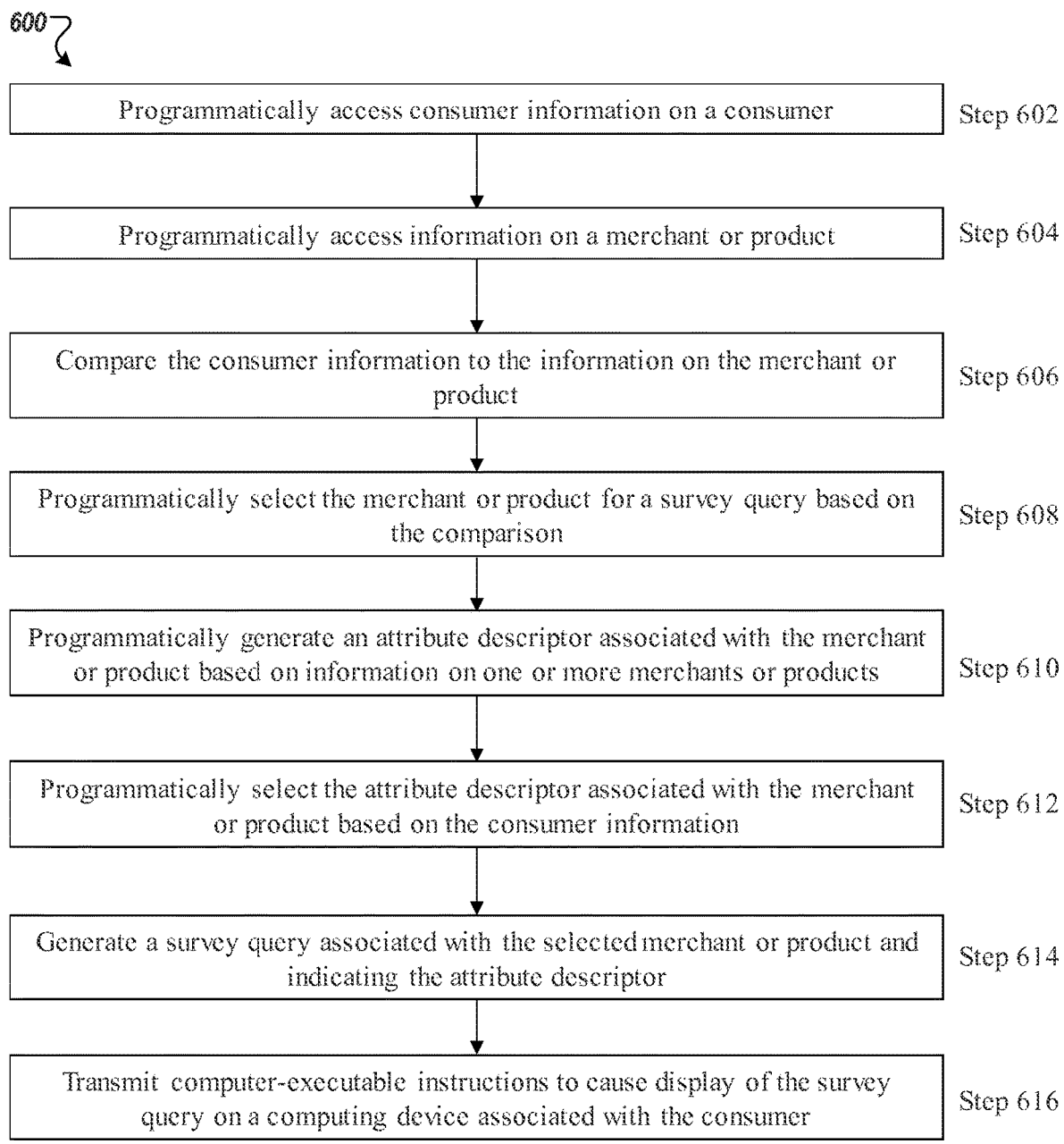

FIG. 6 is a flowchart illustrating an exemplary computer-executable method 600 for generating a survey query for soliciting a consumer rating and/or review of a commercial entity or commercial object. In this exemplary method, information on a particular consumer may be used to programmatically select a commercial entity or object that is suitable for rating and/or review by that particular consumer. For example, a commercial entity or object may be selected so that information on the consumer indicates that the commercial entity or object may be of interest or relevance to the consumer. In this exemplary method, information on a consumer may be used to programmatically select an attribute descriptor that is suitable for rating and/or review by a particular consumer. For example, an attribute descriptor may be selected so that information on the consumer indicates that the attribute descriptor may be of interest or relevance to the consumer. The steps of FIG. 6 are described with reference to corresponding steps in FIGS. 4 and 5.

Figure 7:
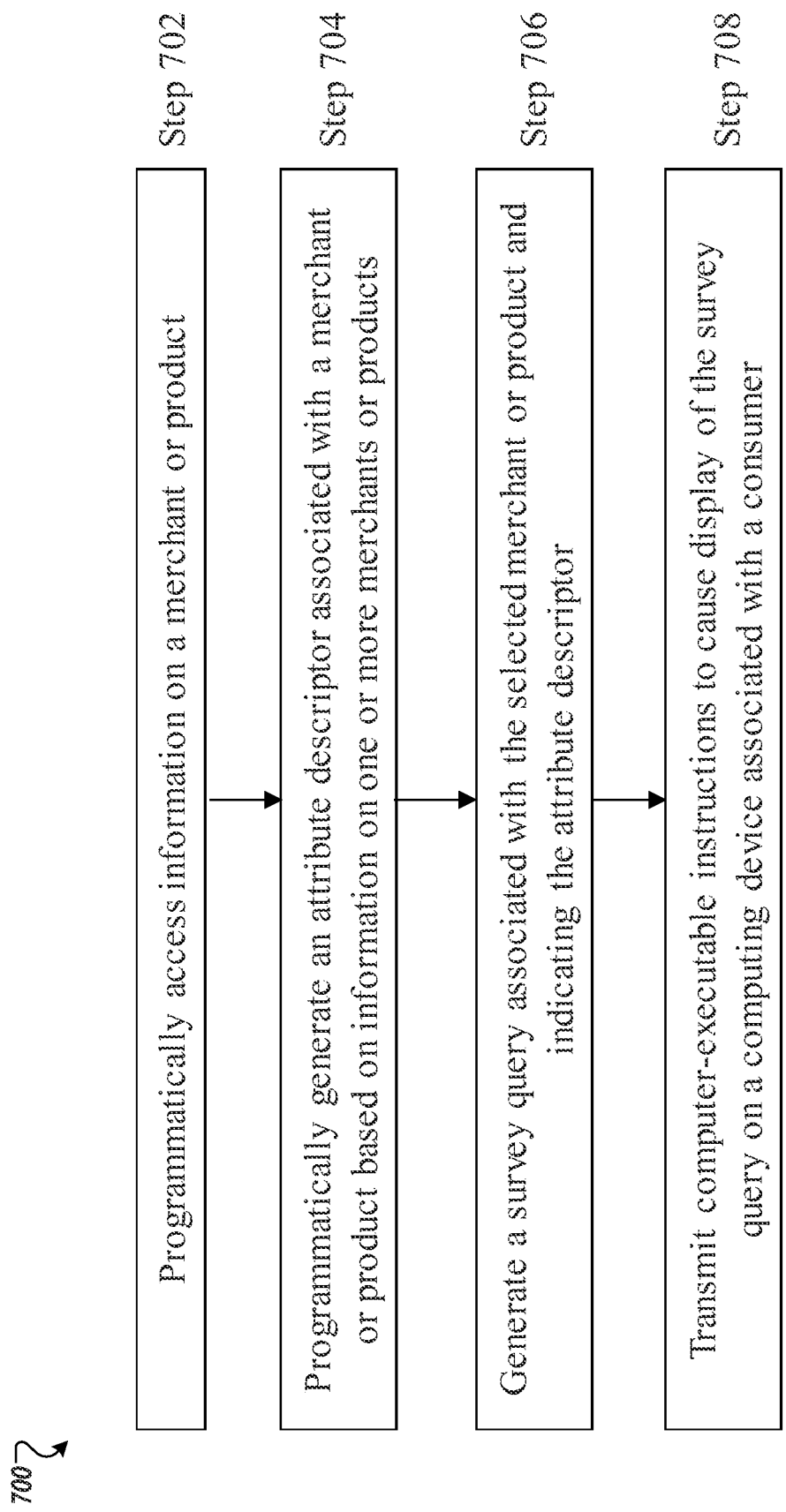
Figure 8A:
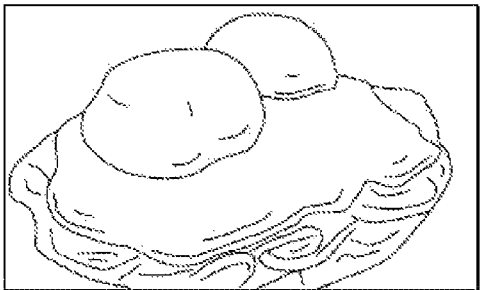
FIGS. 8A-8D illustrate exemplary user interfaces, each displaying a survey query indicating an attribute descriptor for a merchant.
Figure 8B:
Figure 8C:
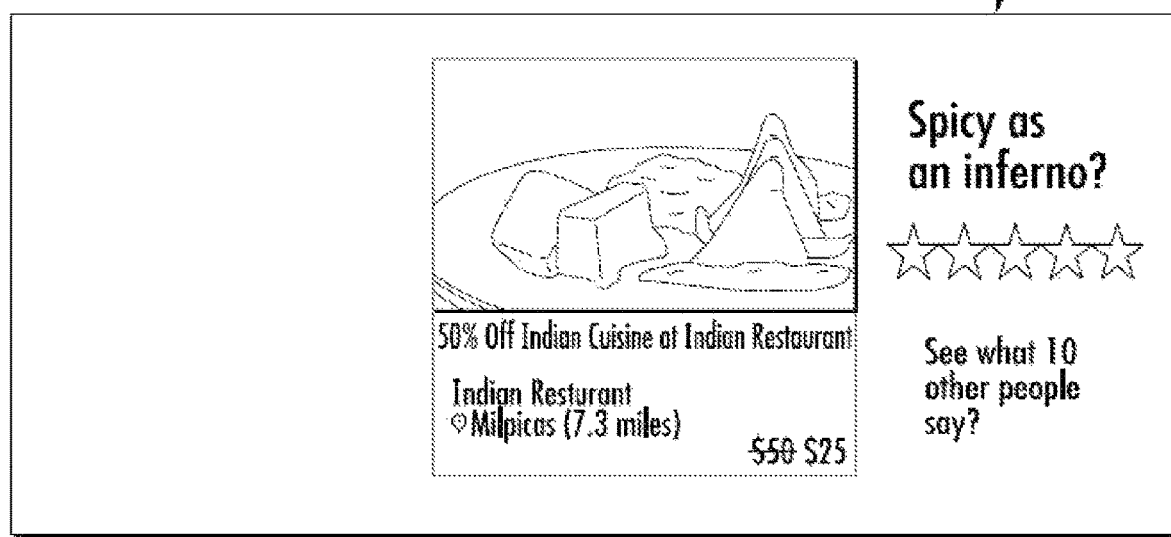
Figure 8D:
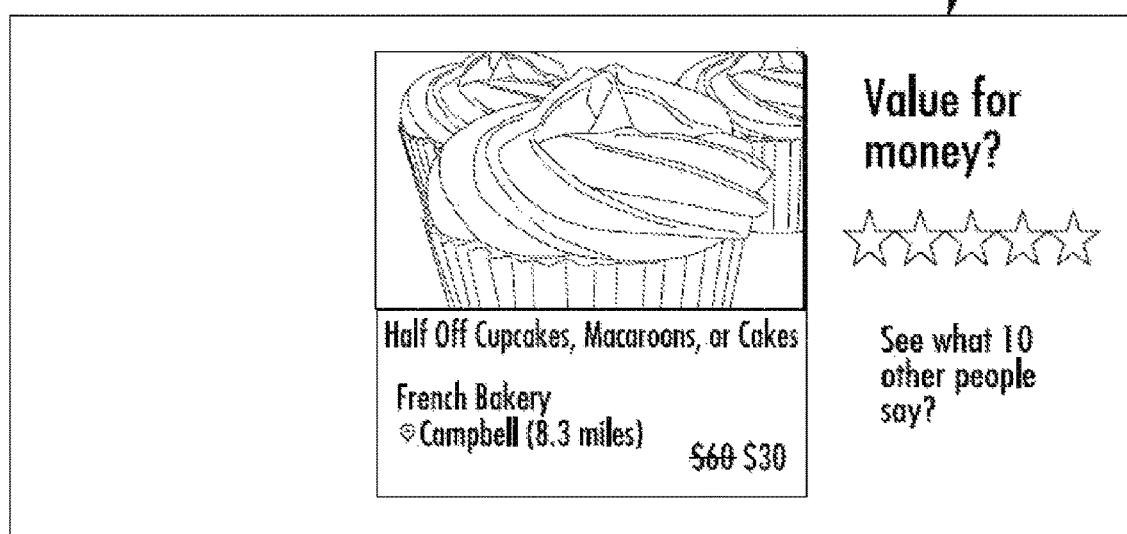
Figure 9A:
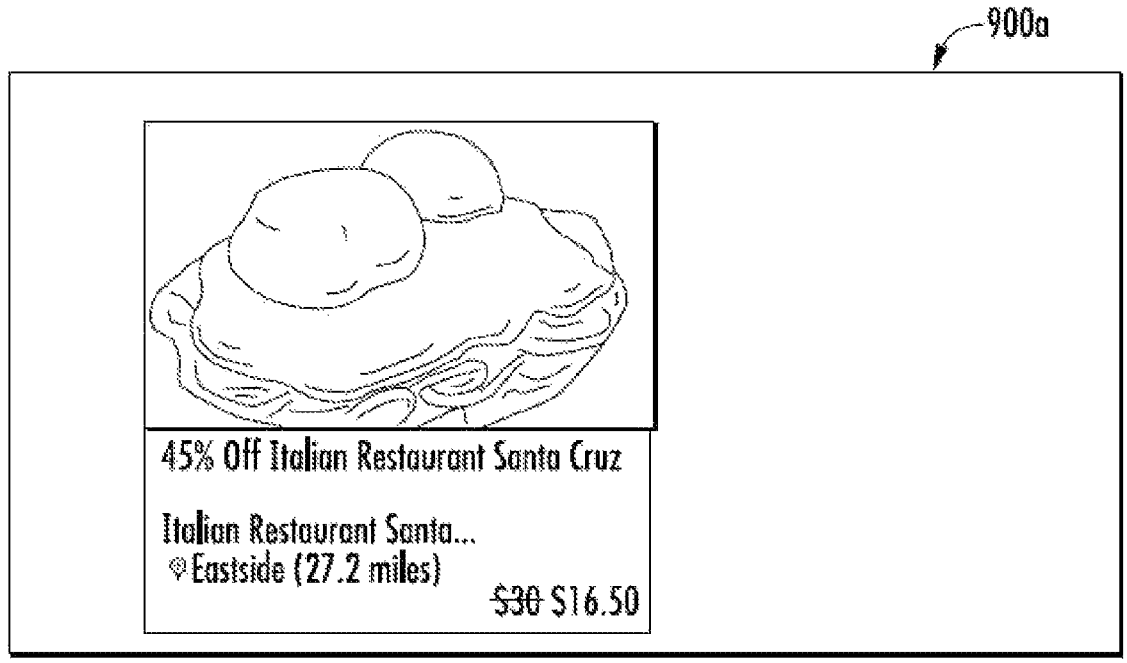
FIGS. 9A-9D illustrate exemplary user interfaces, each recommending a particular merchant to a consumer.
Figure 9B:
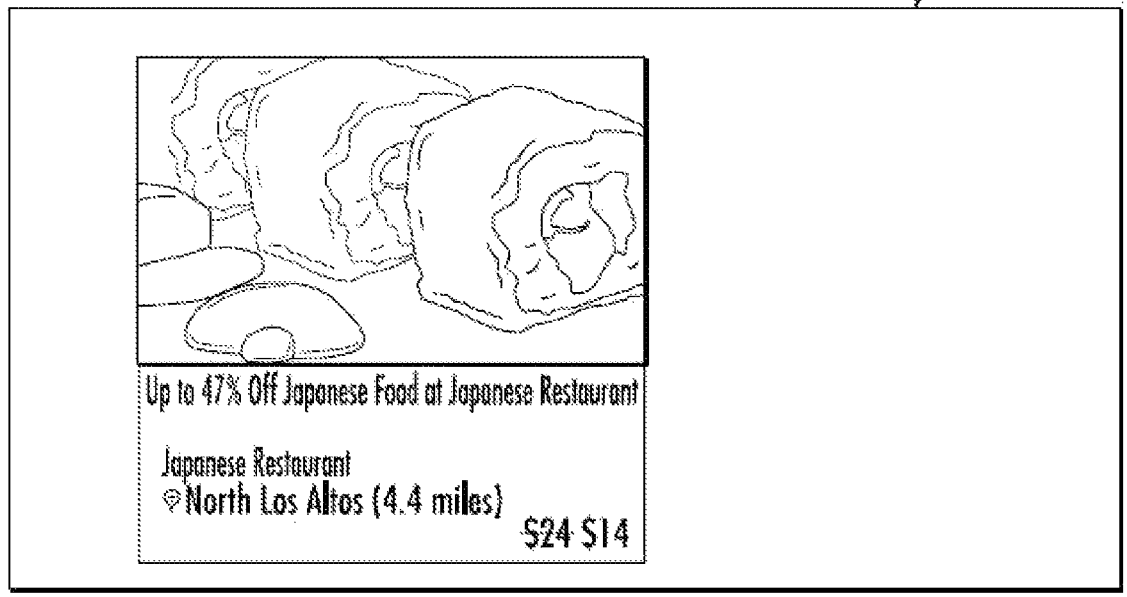
Figure 9C:
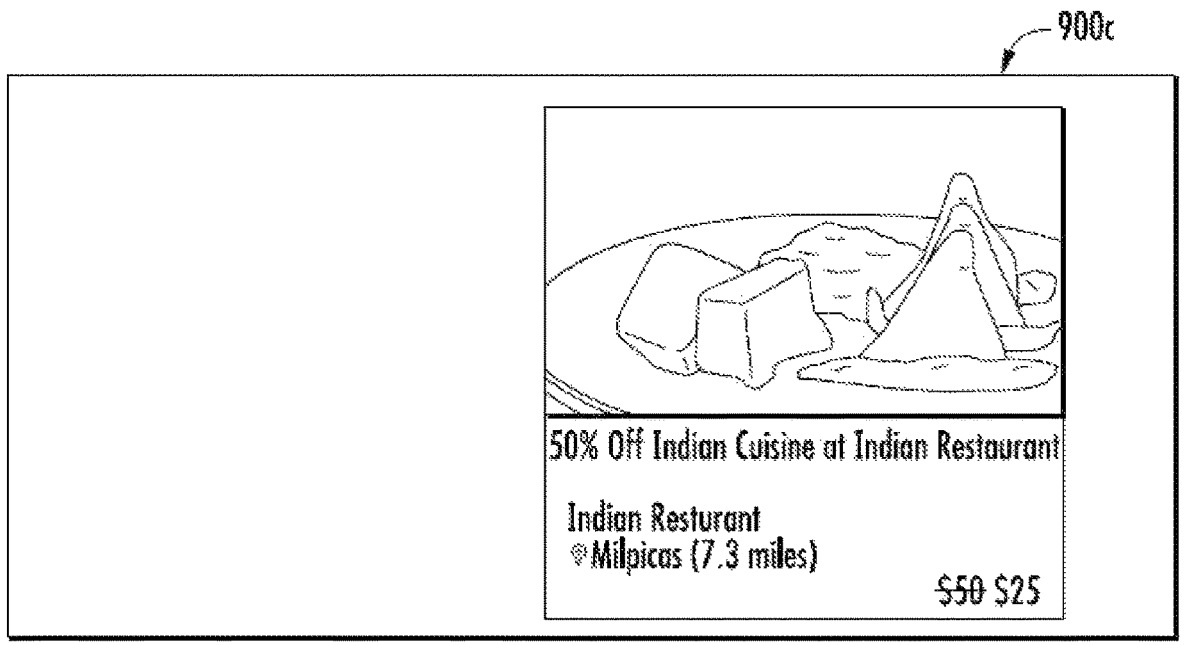
Figure 9D:
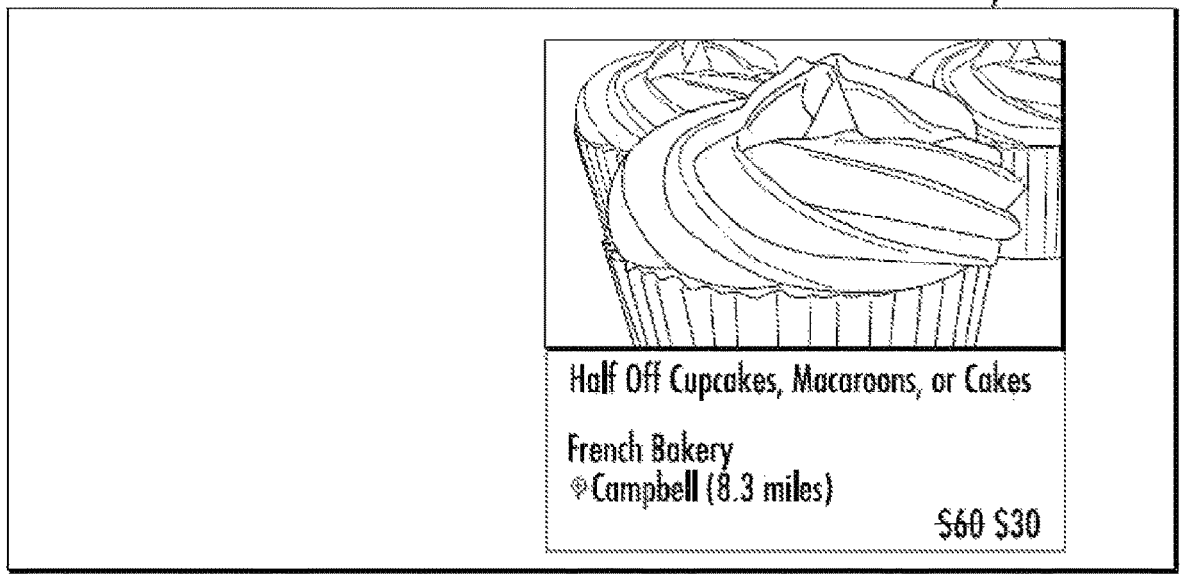

FIG. 7 is a flowchart illustrating an exemplary computer-executable method 700 for generating a survey query for soliciting a consumer rating and/or review of a commercial entity or commercial object. In this exemplary method, information on a commercial entity or object may be used to programmatically determine an attribute descriptor for the commercial entity or object to be used in a survey query. The steps of FIG. 7 are described with reference to corresponding steps in FIGS. 4 and 5.

In certain non-limiting embodiments, the survey query may be transmitted to the consumer in FIG. 7 only if the attribute descriptor and/or the commercial entity/object are determined to be of relevance or interest to the consumer. This may be determined by comparing the attribute description to the consumer information and/or by comparing the consumer entity/object information to the consumer information.

In certain cases, the attribute descriptor may provide a contextual description or opinion describing a contextual feature or attribute of a commercial entity or object. In certain cases, the attribute descriptor may indicate a quality associated with a commercial entity or object. In certain cases, the attribute descriptor may indicate an event or happening regarding a commercial entity or object. In certain cases, the attribute descriptor may broadly indicate a feature, categorization or sub-categorization of any feature of a commercial entity or object.

FIGS. 8A-8D illustrate exemplary user interfaces 800a-800d, each displaying a survey query indicating an attribute descriptor for a merchant. For example, interfaces 800a-800d may display the following attribute descriptors, respectively: "authentic Italian," "freshest sushi ever," "spicy as hell" and "value for money." In certain cases, a merchant may be identified by its name and, optionally, by additional information (e.g., a location on a map, a photo, a menu). Each attribute descriptor may be indicated in the form of a survey query and may be associated with a user input field that enables a consumer to rate, rank or otherwise provide an assessment of the attribute descriptor.

In certain embodiments, upon programmatically determining that a particular commercial entity or object is to be selected for a survey query for a particular consumer, the commercial entity or object may be recommended to the consumer. In some cases, this recommendation may be performed independent of a survey question provided to the consumer. FIGS. 9A-9D illustrate exemplary user interfaces 900a-900d, each recommending a particular merchant to a consumer.

Figure 10A:
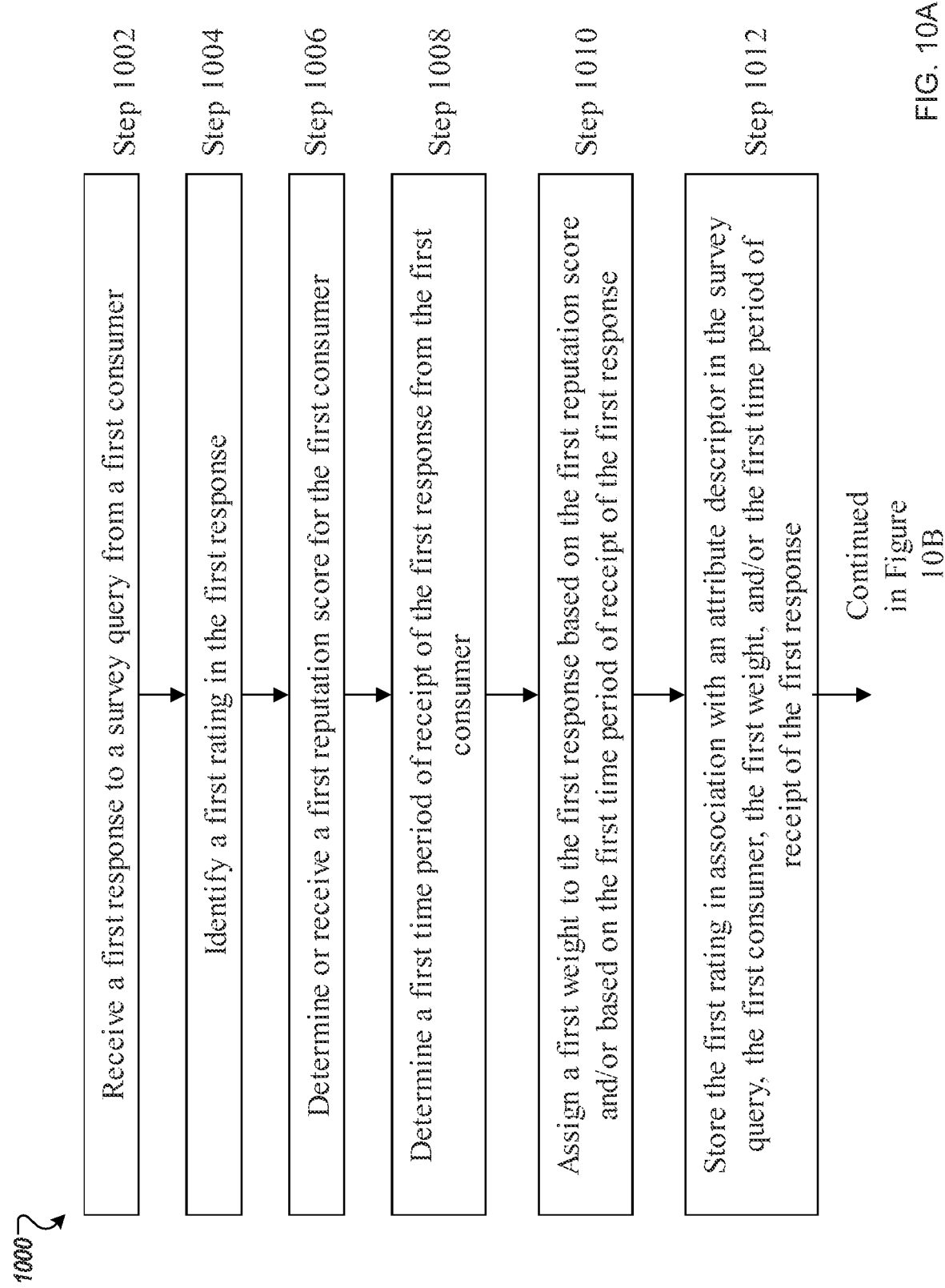
FIGS. 10A and 10B are flowcharts illustrating an exemplary computer-executable method for generating an overall rating or score for an attribute descriptor associated with a commercial entity or object.
Figure 10B:
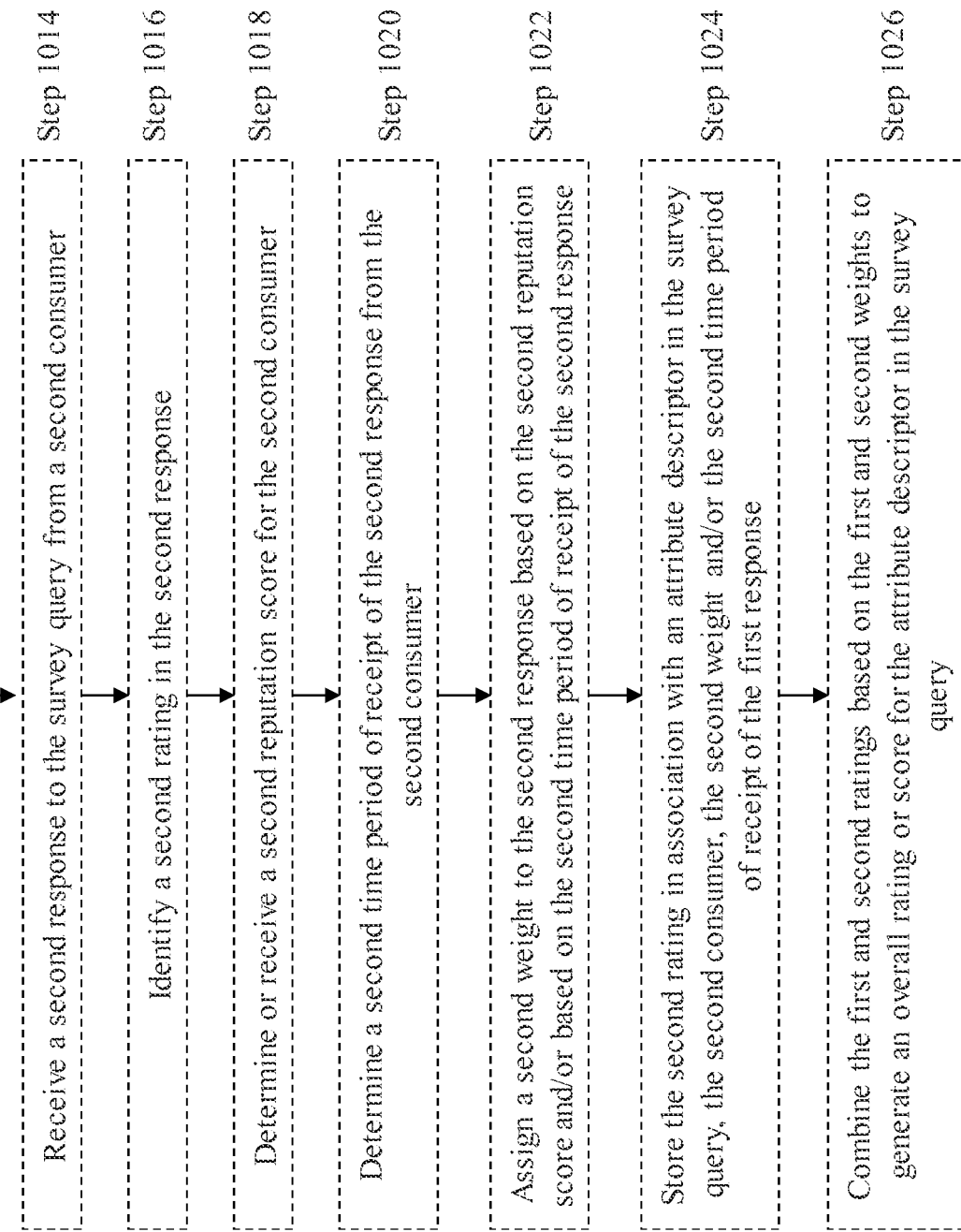

FIGS. 10A and 10B are flowcharts illustrating an exemplary computer-executable method 1000 for generating a rating or score for an attribute descriptor based on input provided by one or more consumers. The rating or score may be generated based on one or more responses to a survey query regarding the attribute descriptor that are received from one or more consumers.

In step 1002, a first response to a survey query may be received from a first consumer. The survey query may solicit a quantitative or qualitative rating or score regarding an attribute descriptor. In step 1004, a first rating or score may be identified in the first response. In step 1006, a first reputation score for the first consumer may be identified, determined or received. The first reputation score may indicate a reputation and/or reliability of the first consumer and may be updated with time. The reputation score may, in some cases, be determined based on one or more prior activities performed by the first consumer (e.g., prior ratings or score provided by the first consumer, online trolling activities, ratings or reviews of the first consumer's activities by other consumers). In step 1008, a first time period during which the first response is received may be determined.

In step 1010, a first weight may be assigned to the first rating or score. The first weight may be assigned based on one or more factors including, but not limited to, the first time period (so that older ratings are assigned lower weights than more recent ratings), the first reputation score (so that ratings from higher-reputation consumers are assigned higher weights), and the like.

In step 1012, the first rating or score may be stored on a non-transitory computer-readable medium. The first rating or score may be stored in association with one or more of: an attribute descriptor in the survey query, an identification of the first consumer, the first weight, the first time period, and the like.

In step 1014, a second response to the survey query may be received from a second consumer. In step 1016, a second rating or score may be identified in the second response. In step 1018, a second reputation score for the second consumer may be identified, determined or received. The second reputation score may indicate a reputation and/or reliability of the second consumer and may be updated with time. The reputation score may, in some cases, be determined based on one or more prior activities performed by the second consumer (e.g., prior ratings or score provided by the first consumer). In step 1020, a second time period during which the second response is received may be determined.

In step 1022, a second weight may be assigned to the second rating or score. The second weight may be assigned based on one or more factors including, but not limited to, the second time period (so that older ratings are assigned lower weights than more recent ratings), the second reputation score (so that ratings from higher-reputation consumers are assigned higher weights), and the like.

In step 1024, the second rating or score may be stored on a non-transitory computer-readable medium. The second rating or score may be stored in association with one or more of: an attribute descriptor in the survey query, an identification of the second consumer, the second weight, the second time period, and the like.

In step 1026, an overall rating or score may be generated for the attribute descriptor of the commercial entity or object. In an exemplary embodiment, the first and second ratings adjusted by the first and second weights, respectively, may be combined (e.g., added or averaged) to generate the overall rating or score.

In some cases, a single overall rating or score may be generated for the attribute descriptor. In other cases, an overall positive rating or score may be generated based on positive ratings provided in survey query responses (e.g., "great heat" attribute descriptor may have a rating of 4 out of 5), and an overall negative rating or score may be generated based on negative ratings provided in survey query responses (e.g., "too hot" attribute descriptor may have a rating of 2 out of 5).

In some embodiments, one or more attribute descriptors associated with a commercial entity or object may be displayed for a consumer. The top n number of attribute descriptors may be selected based on their ratings for display. Certain embodiments may provide different visualization options to provide rating or review information in a succinct and easy to view manner. For example, consumers may be allowed to quickly determine the ratio between the positive and negative ratings without having to read the attribute descriptors (e.g., by providing positive ratings in green font and negative ratings in red font and by varying the font size based on the magnitude of the ratings). Consumer may also be allowed to read individual reviews and ratings, and may be allowed to view information on the weights associated with the ratings. One exemplary visualization technique is a tag cloud in which each tag is an attribute descriptor and in which positive tags are provided in a first font color while negative tags are provided in a second font color and in which the font size varies with the rating for each attribute descriptor.

Figure 11:
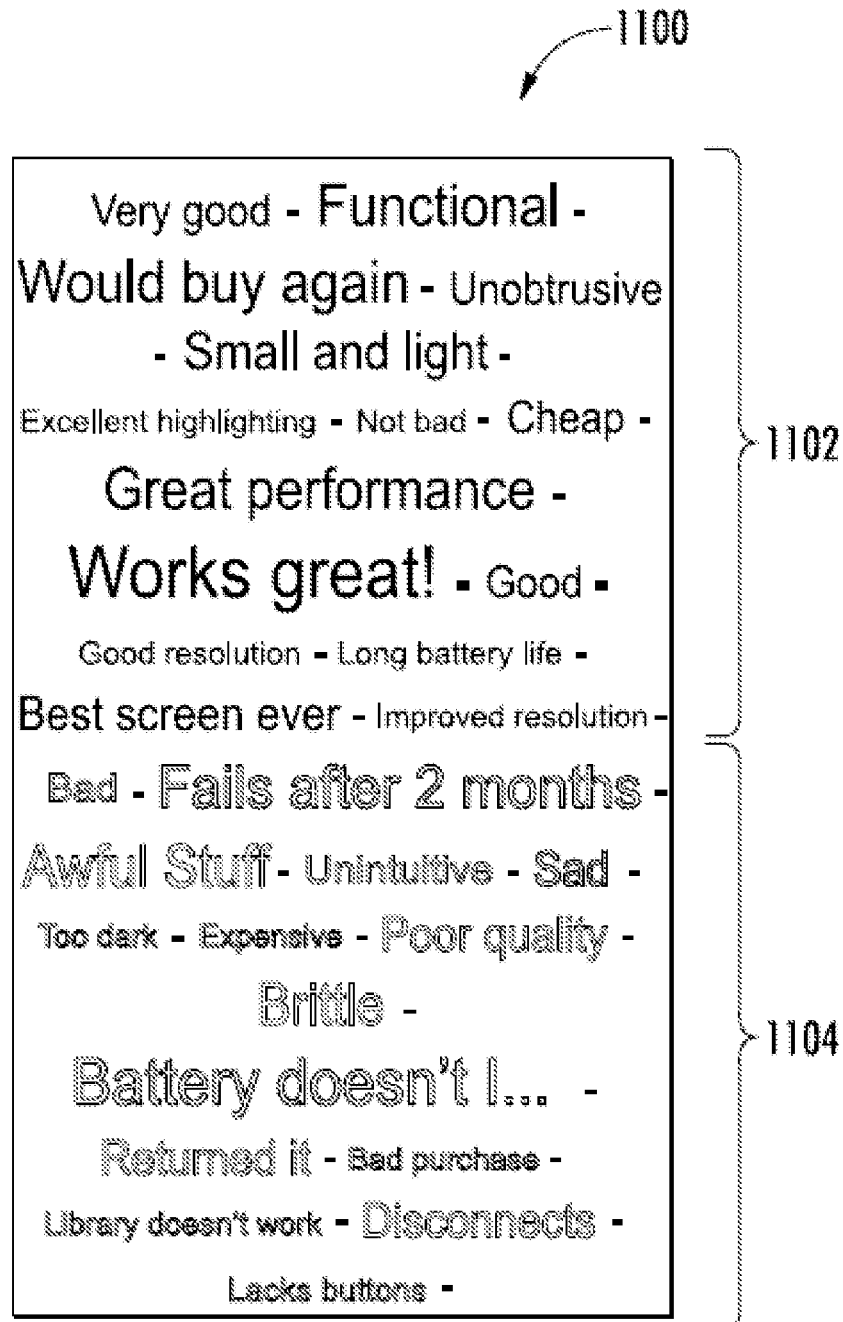
FIG. 11 illustrates an exemplary user interface displaying attribute descriptors for a commercial object.

FIG. 11 illustrates an exemplary user interface 1100 in which attribute descriptors and information on associated consumer survey responses are displayed for a product. The font size of each attribute descriptor may be proportional to the rating or score associated with the attribute descriptor, as described in connection with FIGS. 10A and 10B. The font line thickness of each attribute descriptor may be proportional to the weight of the consumer reviews associated with the attribute descriptor, as described in connection with FIGS. 10A and 10B. The font color of each attribute descriptor may be selected based on the sentiment associated with the attribute descriptor; for example, in some embodiments, attribute descriptors in portion 1102 of the user interface 1100 may be in green font (to indicate positive sentiment) and attribute descriptors in portion 1104 of the user interface 1100 may be in red font (to indicate negative sentiment).

Figure 12A:
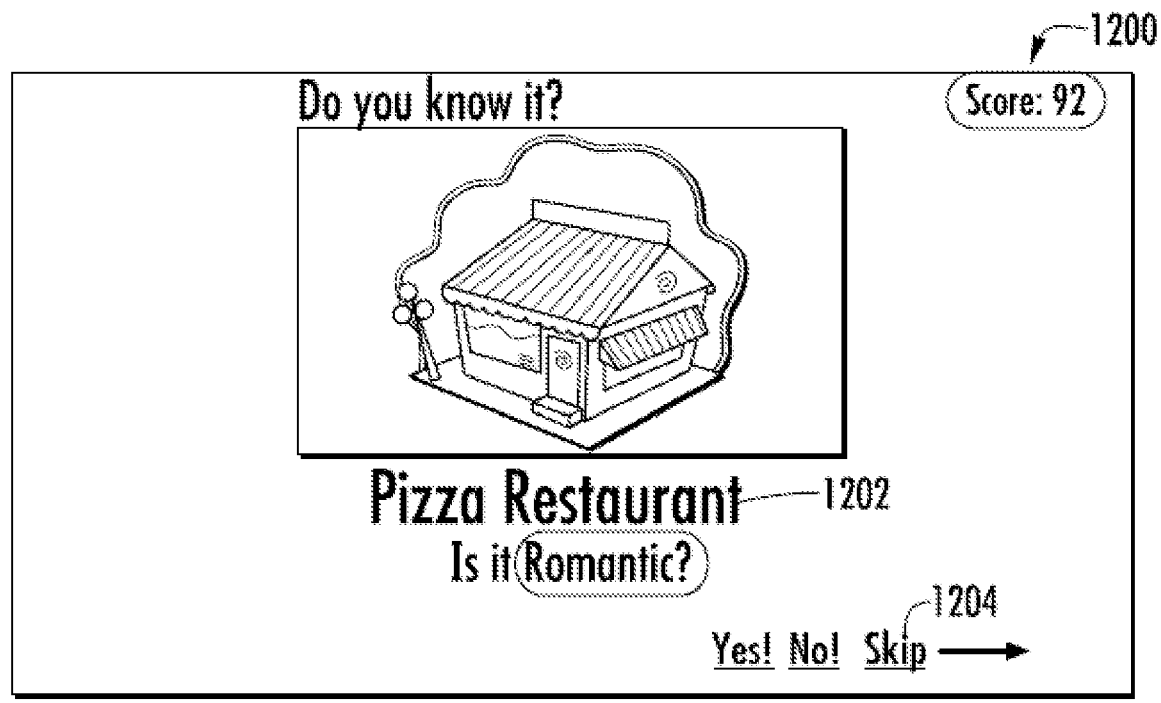
FIGS. 12A and 12B illustrate an exemplary user interface displaying a game that enables a consumer to respond to survey queries.

Certain embodiments may provide one or more games to encourage and incentivize consumers to provide responses to survey queries. Exemplary games may provide a real or virtual reward before, during and/or after the game (e.g., promotion rewards, a position on a leaderboard, a status on a website). Exemplary games may be fast and provide instant feedback to the consumer playing the games. In one exemplary game, a user interface is rendered to display a merchant or product identification and, in some cases, its address and a photo. An attribute descriptor for the merchant or product may be selected from a pool of existing attribute descriptors across all merchants or products of the same category (e.g., all restaurants). A survey query may be programmatically generated indicating the attribute descriptor, and displayed on the user interface. The consumer playing the game may be provided with multiple options to indicate whether the consumer agrees with the attribute descriptor. The options may include, for example: yes, no or skip (or "don't know it"). In certain other cases, the options may enable a consumer to enter a numeric rating or an alphanumeric review associated with the attribute descriptor. FIG. 12A illustrates an exemplary user interface 1200 displaying a survey query 1202 ("Alphonso's Pizza—Is it romantic?") indicating an attribute descriptor ("romantic") and the name of a restaurant merchant ("Alphonso's Pizza"). The user interface 1200 also displays user-selectable options 1204, enabling a consumer to select "yes," "no" or "skip" in association with the attribute descriptor 1202.

Figure 12B:
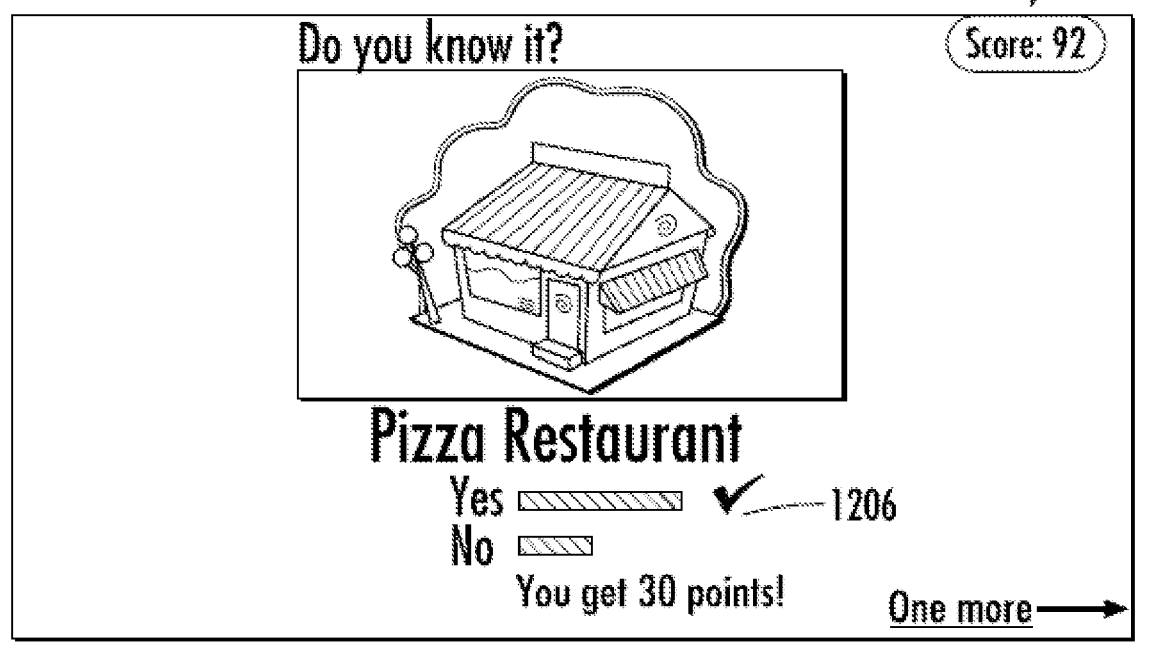

Once a choice is made by the consumer using user-selectable options 1204, a poll of the number of "yes" and "no" selections by all consumers may be shown on the user interface. FIG. 12B illustrates an exemplary user interface 1250 displaying a poll of results 1206 aggregating the responses provided by all of the players of the game in the user interface of FIG. 12A. A score delta may be generated for a particular consumer based on the percentage of all consumer selections that belonged in the option selected by that particular consumer (e.g., the percentage of "yes" votes among all votes). If the particular consumer selected the option also selected by a majority of consumers, then he/she may add the score delta to his/her score; otherwise, he/she subtracts the score delta from his/her score. Multiple attribute descriptors for the same or for different merchants may be displayed and rated in the same manner.

In certain embodiments, a consumer may be provided with a reward or a bonus under some circumstances, for example, if he/she is the first to play the game. After a consumer has rated a certain number of merchants and/or attribute descriptors, his/her score may be accumulated and rewards (e.g., badges, points) may be provided for achieving score milestones (e.g., 1000 points, 500 tries, 5 hits in a row). A leaderboard may be maintained so that the consumer's score is ranked with those of other players of the game.

III. Exemplary Computing Devices

Systems and methods disclosed herein may include one or more programmable processing units having associated therewith executable instructions held on one or more computer readable media, RAM, ROM, hard drive, and/or hardware. In exemplary embodiments, the hardware, firmware and/or executable code may be provided, for example, as upgrade module(s) for use in conjunction with existing infrastructure (for example, existing devices/processing units). Hardware may, for example, include components and/or logic circuitry for executing the embodiments taught herein as a computing process.

Displays and/or other feedback means may also be included, for example, for rendering a graphical user interface, according to the present disclosure. The display and/or other feedback means may be stand-alone equipment or may be included as one or more components/modules of the processing unit(s).

The actual software code or control hardware which may be used to implement some of the present embodiments is not intended to limit the scope of such embodiments. For example, certain aspects of the embodiments described herein may be implemented in code using any suitable programming language type such as, for example, assembly code, C, C# or C++ using, for example, conventional or object-oriented programming techniques. Such code is stored or held on any type of suitable non-transitory computer-readable medium or media such as, for example, a magnetic or optical storage medium.

As used herein, a "processor," "processing unit," "computer" or "computer system" may be, for example, a wireless or wire line variety of a microcomputer, minicomputer, server, mainframe, laptop, personal data assistant (PDA), wireless e-mail device (for example, "BlackBerry," "Android" or "Apple," trade-designated devices), cellular phone, pager, processor, fax machine, scanner, or any other programmable device configured to transmit and receive data over a network. Computer systems disclosed herein may include memory for storing certain software applications used in obtaining, processing and communicating data. It can be appreciated that such memory may be internal or external to the disclosed embodiments. The memory may also include non-transitory storage medium for storing software, including a hard disk, an optical disk, floppy disk, ROM (read only memory), RAM (random access memory), PROM (programmable ROM), EEPROM (electrically erasable PROM), flash memory storage devices, or the like.

Figure 13:
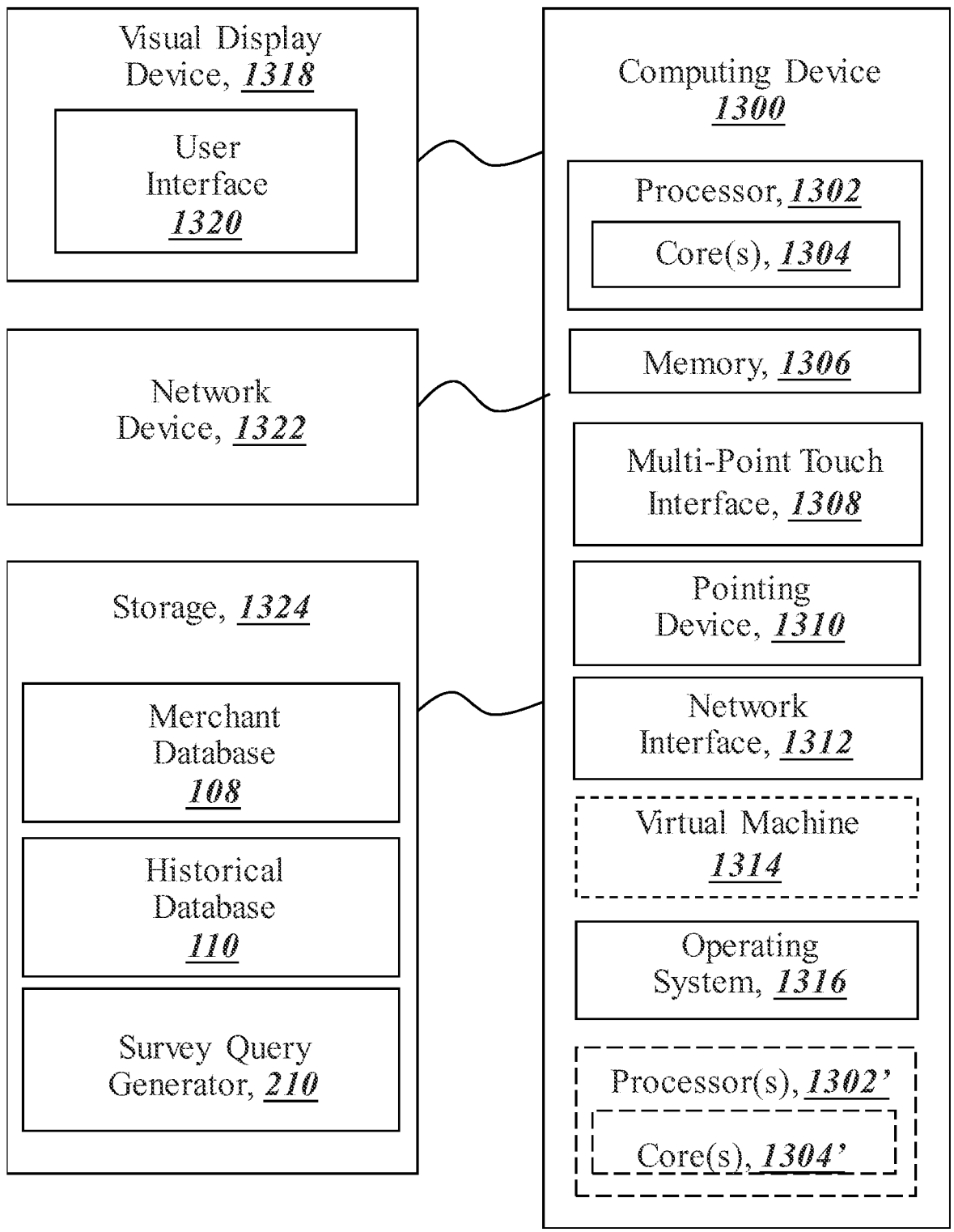
FIG. 13 is a block diagram of an exemplary computing device that may be used to implement and execute exemplary computer-executable methods.

FIG. 13 depicts a block diagram representing an exemplary computing device 1300 that may be used to implement the systems and methods disclosed herein. The computing device 1300 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described herein. In exemplary embodiments, a distributed computational system may include a plurality of such computing devices.

The computing device 1300 includes one or more non-transitory computer-readable media having encoded thereon one or more computer-executable instructions or software for implementing the exemplary methods described herein. The non-transitory computer-readable media may include, but are not limited to, one or more types of hardware memory and other tangible media (for example, one or more magnetic storage disks, one or more optical disks, one or more USB flash drives), and the like. For example, memory 1306 included in the computing device 1300 may store computer-readable and computer-executable instructions or software for implementing a graphical user interface as described herein. The computing device 1300 also includes processor 1302 and associated core 1304, and in some embodiments, one or more additional processor(s) 1302' and associated core(s) 1304' (for example, in the case of computer systems having multiple processors/cores), for executing computer-readable and computer-executable instructions or software stored in the memory 1302 and other programs for controlling system hardware. Processor 1302 and processor(s) 1302' may each be a single core processor or a multiple core (1304 and 1304') processor.

Virtualization may be employed in the computing device 1300 so that infrastructure and resources in the computing device may be shared dynamically. A virtual machine 1314 may be provided to handle a process running on multiple processors so that the process appears to be using only one computing resource rather than multiple computing resources. Multiple virtual machines may also be used with one processor.

Memory 1306 may include a computer system memory or random access memory, such as DRAM, SRAM, EDO RAM, and the like. Memory 1306 may include other types of memory as well, or combinations thereof.

A user may interact with the computing device 1300 through a visual display device 1318, such as a screen or monitor, which may display one or more graphical user interfaces 1320 provided in accordance with exemplary embodiments described herein. The visual display device 1318 may also display other aspects, elements and/or information or data associated with exemplary embodiments.

The computing device 1300 may include other I/O devices for receiving input from a user, for example, a keyboard or any suitable multi-point touch interface 1308 or pointing device 1310 (e.g., a mouse, a user's finger interfacing directly with a display device). As used herein, a "pointing device" is any suitable input interface, specifically, a human interface device, that allows a user to input spatial data to a computing system or device. In an exemplary embodiment, the pointing device may allow a user to provide input to the computer using physical gestures, for example, pointing, clicking, dragging, dropping, and the like. Exemplary pointing devices may include, but are not limited to, a mouse, a touchpad, a finger of the user interfacing directly with a display device, and the like.

The keyboard 1308 and the pointing device 1310 may be coupled to the visual display device 1318. The computing device 1300 may include other suitable conventional I/O peripherals. The I/O devices may facilitate implementation of the one or more graphical user interfaces 1320, for example, implement one or more of the graphical user interfaces described herein.

The computing device 1300 may include one or more storage devices 1324, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement exemplary embodiments as taught herein. In exemplary embodiments, the one or more storage devices 1324 may provide storage for data that may be generated by the systems and methods of the present disclosure. For example, a storage device 1324 may provide storage for a merchant database 108 including information on one or more merchants, and for a historical database 110 including information on one or more prior activities performed by consumers and profile information on consumers. A storage device 1324 may also provide storage for a survey query generator 210 programmed and configured to programmatically generate one or more survey queries for a survey. The one or more storage devices 1324 may be provided on the computing device 1300 and/or provided separately or remotely from the computing device 1300. The exemplary components depicted as being stored on storage device 1324 may be stored on the same or on different storage devices.

The computing device 1300 may include a network interface 1312 configured to interface via one or more network devices 1322 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1312 may include a built-in network adapter, network interface card, PCMCIA network card, card bus network adapter, wireless network adapter, USB network adapter, modem or any other device suitable for interfacing the computing device 1300 to any type of network capable of communication and performing the operations described herein. The network device 1322 may include one or more suitable devices for receiving and transmitting communications over the network including, but not limited to, one or more receivers, one or more transmitters, one or more transceivers, one or more antennae, and the like.

The computing device 1300 may run any operating system 1316, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 1316 may be run in native mode or emulated mode. In an exemplary embodiment, the operating system 1316 may be run on one or more cloud machine instances.

One of ordinary skill in the art will recognize that exemplary computing device 1300 may include more or fewer modules than those shown in FIG. 13.

In describing exemplary embodiments, specific terminology is used for the sake of clarity. For purposes of description, each specific term is intended to, at least, include all technical and functional equivalents that operate in a similar manner to accomplish a similar purpose. Additionally, in some instances where a particular exemplary embodiment includes a plurality of system elements or method steps, those elements or steps may be replaced with a single element or step. Likewise, a single element or step may be replaced with a plurality of elements or steps that serve the same purpose. Further, where parameters for various properties are specified herein for exemplary embodiments, those parameters may be adjusted up or down by ¹/₂₀th, ¹/₁₀th, ¹/₅th, ¹/₃rd, ¹/₂nd, and the like, or by rounded-off approximations thereof, unless otherwise specified. Moreover, while exemplary embodiments have been shown and described with references to particular embodiments thereof, those of ordinary skill in the art will understand that various substitutions and alterations in form and details may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than shown.

Blocks of the block diagram and the flow chart illustrations support combinations of means for performing the specified functions, combinations of steps for performing the specified functions and program instruction means for performing the specified functions. It will also be understood that some or all of the blocks/steps of the circuit diagram and process flowchart, and combinations of the blocks/steps in the circuit diagram and process flowcharts, can be implemented by special purpose hardware-based computer systems that perform the specified functions or steps, or combinations of special purpose hardware and computer instructions. Exemplary systems may include more or fewer modules than those illustrated in the exemplary block diagrams.

Many modifications, combinations and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications, combinations and other embodiments are intended to be included within the scope of the appended claims. Although specific terms are employed herein, they are used in a generic and descriptive sense only and not for purposes of limitation.

What is claimed is:

1. A computing system, comprising:
one or more computers and one or more storage devices storing instructions that are operable, when executed by the one or more computers, to cause the one or more computers to perform operations implementing programmatically generating one or more survey queries, the operations comprising:
accessing, from a historical database configured to store information related to a set of commercial objects associated with respective goods, services or promotions, textual information related to a first commercial object from the set of commercial objects, wherein the first commercial object is associated with a first good, service or promotion;
determining a first location associated with a consumer identifier;
selecting a second commercial object associated with a second good, service or promotion that is different than the first commercial object, the selecting the second commercial object based on a comparison between a second location associated with the second commercial object and the first location associated with the consumer identifier;
based on a textual analysis technique with respect to the textual information related to the first commercial object, programmatically generating an attribute descriptor for the second commercial object, wherein the textual analysis technique comprises parsing the textual information to define feature text information and quantifier text information for the first commercial object, and the programmatically generating the attribute descriptor comprising replacing, based on the feature text information and the quantifier text information, at least a portion of the textual information with synonym text information to generate the attribute descriptor for the second commercial object;
in response to programmatically generating the attribute descriptor, configuring a promotion application program with a survey query for the second commercial object, wherein the survey query is formatted to include the attribute descriptor and a user-selectable option configured to enable user input associated with the attribute descriptor, wherein the promotion application program is configured for repeated communication between a remote computing device and a consumer computing device to provide computer-executable functionality to the consumer computing device;
configuring computer-executable instructions to cause a multi-point touch interface for a visual display of the consumer computing device to render (i) a graphical element associated with the second commercial object and (ii) the survey query formatted to include the attribute descriptor and the user-selectable option configured to enable the user input associated with the attribute descriptor;
determining a communication mode for the consumer computing device based on one or more communication capabilities associated with a processor of the consumer computing device;
transmitting, via one or more network devices configured to establish a network connection between the consumer computing device and the remote computing device using the communication mode for the consumer computing device, the computer-executable instructions to the consumer computing device associated to initiate the promotion application program to establish the repeated communication between the remote computing device and the consumer computing device, and to provide the multi-point touch interface for the visual display of the consumer computing device; and in response to generation of a response to the survey query via the multi-point touch interface,
generating, based on the response to the survey query, a first rating for the attribute descriptor that is programmatically generated for the second commercial object based on the textual analysis technique with respect to the textual information for the first commercial object;
receiving a reputation score for the consumer identifier, wherein the reputation score is pre-determined based on one or more prior activities associated with the consumer identifier;
determining a time period of receipt of the response from the consumer computing device;
assigning a weight to the response based on the time period and the reputation score;
updating the first rating for the attribute descriptor based on the weight to generate an overall rating for the attribute descriptor;
generating new information for the second commercial object based on the overall rating for the attribute descriptor; and
storing the new information for the second commercial object in the historical database.

2. The computing system of claim 1, wherein the first commercial object corresponds to a first merchant and the second commercial object corresponds to a second merchant.

3. The computing system of claim 2, wherein the textual information includes one or more of: a description of the first merchant, a location of the first merchant, a name of the first merchant, one or more prior activities of the first merchant, information on one or more products or product types offered by the first merchant, information on one or more services or service types offered by the first merchant, information on one or more promotions offered by the first merchant, price information associated with the first merchant, or one or more consumer ratings or reviews provided for the first merchant.

4. The computing system of claim 3, wherein the description of the first merchant includes one or more of: a description of ambiance at the location associated with the first merchant, a description of a quality of a product or service offered by the first merchant, or a description of customer service associated with the first merchant.

5. The computing system of claim 3, wherein the one or more consumer ratings or reviews include one or more of: one or more quantitative ratings, or one or more qualitative reviews.

6. The computing system of claim 3, wherein the textual information includes one or more of: a category or sub-category of a product or service offered by the first merchant, a price, a sentiment associated with the product or the service, an event or occasion associated with the product or service, or a quality rating associated with the product or service.

7. The computing system of claim 1, wherein the first commercial object is a first product and the second commercial object is a second product.

8. The computing system of claim 7, wherein the textual information includes one or more of: a description of a merchant associated with the first commercial object, a location of the merchant, a name of the merchant, information on the first commercial object, or one or more consumer ratings or reviews provided for the first commercial object.

9. The computing system of claim 8, wherein the textual information includes one or more of: a category or sub-category of the first commercial object, a price of the first commercial object, a sentiment associated with the first commercial object, an event or occasion associated with the first commercial object, or a quality rating associated with the first commercial object.

10. The computing system of claim 1, wherein the textual information is accessed by programmatically retrieving online information on the first commercial entity or object.

11. The computing system of claim 1, wherein the attribute descriptor indicates a context associated with the first commercial object.

12. The computing system of claim 1, wherein the attribute descriptor indicates a quality associated with the first commercial object.

13. The computing system of claim 1, wherein the attribute descriptor indicates a category or sub-category associated with the first commercial object.

14. The computing system of claim 1, wherein the user-selectable option provides a predetermined set of selectable rating categories regarding the attribute descriptor.

15. The computing system of claim 1, the operations further comprising:
storing the first rating associated with the attribute descriptor on a non-transitory computer-readable medium; and
storing, on the non-transitory computer-readable medium, the time period in association with the first rating and in association with the attribute descriptor.

16. The computing system of claim 1, wherein the user-selectable option enables input of free text.

17. The computing system of claim 16, the operations further comprising:
removing one or more stop words from the input of free text;
merging two or more synonyms in the input of free text; and
consolidating two or more quantifiers in the input of free text into a predetermined quantifier.

18. The computing system of claim 1, wherein the programmatically generating the attribute descriptor comprises:
removing one or more stop words from the textual information;
merging two or more synonyms in the textual information;
identifying a sentiment in the textual information; and
combining two or more quantifiers in the textual information associated with the sentiment into a predetermined quantifier;
wherein the attribute descriptor includes the sentiment.

19. The computing system of claim 18, wherein the attribute descriptor includes the predetermined quantifier.

20. The computing system of claim 18, wherein a first portion of the textual information is received from a first consumer, wherein the first portion of the textual information indicates a positive sentiment and a first quantifier associated with the attribute descriptor, wherein a second portion of the textual information related to the first commercial object is received from a second consumer, wherein the second portion of the textual information indicates a positive sentiment and a second quantifier associated with the attribute descriptor, and wherein the attribute descriptor includes the positive sentiment and a consolidated quantifier generated based on the first and second quantifiers.

21. The computing system of claim 18, wherein a first portion of the textual information is received from a first consumer, wherein the first portion of the textual information indicates a positive sentiment and a first quantifier associated with the attribute descriptor, wherein a second portion of the textual information related to the first commercial object is received from a second consumer, wherein the second portion of the textual information indicates a negative sentiment and a second quantifier associated with the attribute descriptor, the operations comprising:
   programmatically generating a first attribute descriptor including the positive sentiment and the first quantifier; and
   programmatically generating a second attribute descriptor including the negative sentiment and the second quantifier.

22. The computing system of claim 1, the operations further comprising:
   accessing consumer information associated with the consumer identifier;
   wherein the attribute descriptor is selected based on the consumer information.

23. The computing system of claim 22, wherein the consumer information includes information on one or more prior activities associated with the consumer identifier;
   wherein the attribute descriptor is generated based on a comparison of the textual information and the consumer information.

24. The computing system of claim 23, wherein the one or more prior activities includes one or more purchase activities, one or more product or merchant viewing activities, one or more product or merchant rating activities, one or more promotion viewing activities, or one or more promotion rating activities.

25. The computing system of claim 22, wherein the consumer information includes one or more consumer profile data items associated with the consumer identifier;
   wherein the attribute descriptor is generated based on a comparison of the textual information and the consumer information.

26. The computing system of claim 25, wherein the one or more consumer profile data items indicate one or more of: a consumer identification, an age, a gender, a race, an income, a location associated with the consumer identifier, a merchant preference of the consumer identifier, a product preference of the consumer identifier, or a price preference of the consumer identifier.

27. The computing system of claim 1, the operations further comprising:
   storing the first rating associated with the attribute descriptor on a non-transitory computer-readable medium, the storing of the first rating associated with the consumer identifier; and
   determining a relevance score for a promotion for recommendation to the consumer computing device based on the first rating associated with the attribute descriptor.

28. The computing system of claim 1, the operations further comprising:
   determining the second commercial object based on consumer information of the consumer identifier associated with the consumer computing device.

29. The computing system of claim 28, wherein the consumer information includes one or more consumer profile data items or one or more prior activities associated with the consumer identifier.

30. The computing system of claim 1, the operations further comprising:
   accessing information related to a third commercial object;
   wherein the attribute descriptor is programmatically generated based on the information related to the third commercial object.

31. The computing system of claim 1, wherein programmatically generating the survey query indicating the attribute descriptor comprises:
   prior to programmatically generating the attribute descriptor for the first commercial object, identifying a third commercial object that has one or more overlapping profile data items with the textual information;
   accessing one or more reviews on the third commercial object; and
   programmatically generating the attribute descriptor based on the one or more reviews and the textual information of the first commercial object.

32. The computing system of claim 31, wherein the attribute descriptor includes one or more keywords included in the one or more overlapping profile data items.

33. A computer-implemented method for programmatically generating one or more survey queries, comprising:
   accessing, from a historical database configured to store information related to a set of commercial objects associated with respective goods, services or promotions, textual information related to a first commercial object from the set of commercial objects, wherein the first commercial object is associated with a first good, service or promotion;
   determining a first location associated with a consumer identifier;
   selecting a second commercial object associated with a second good, service or promotion that is different than the first commercial object, the selecting the second commercial object based on a comparison between a second location associated with the second commercial object and the first location associated with the consumer identifier;
   based on a textual analysis technique with respect to the textual information related to the first commercial object, programmatically generating an attribute descriptor for the second commercial object, wherein the textual analysis technique comprises parsing the textual information to define feature text information and quantifier text information for the first commercial object, and the programmatically generating the attribute descriptor comprising replacing, based on the feature text information and the quantifier text information, at least a portion of the textual information with synonym text information to generate the attribute descriptor for the second commercial object;
   in response to programmatically generating the attribute descriptor, configuring a promotion application program with a survey query for the second commercial object, wherein the survey query is formatted to include the attribute descriptor and a user-selectable option configured to enable user input associated with the attribute descriptor, wherein the promotion application program is configured for repeated communication between a remote computing device and a consumer computing device to provide computer-executable functionality to the consumer computing device;
   configuring computer-executable instructions to cause a multi-point touch interface for a visual display of the consumer computing device to render (i) a graphical element associated with the second commercial object and (ii) the survey query formatted to include the attribute descriptor and the user-selectable option configured to enable the user input associated with the attribute descriptor;

determining a communication mode for the consumer computing device based on one or more communication capabilities associated with a processor of the consumer computing device;

transmitting, via one or more network devices configured to establish a network connection between the consumer computing device and the remote computing device using the communication mode for the consumer computing device, the computer-executable instructions to the consumer computing device associated to initiate the promotion application program to establish the repeated communication between the remote computing device and the consumer computing device, and to provide the multi-point touch interface for the visual display of the consumer computing device; and in response to generation of a response to the survey query via the multi-point touch interface,
generating, based on the response to the survey query, a first rating for the attribute descriptor that is programmatically generated for the second commercial object based on the textual analysis technique with respect to the textual information for the first commercial object;
receiving a reputation score for the consumer identifier, wherein the reputation score is pre-determined based on one or more prior activities associated with the consumer identifier;
determining a time period of receipt of the response from the consumer computing device;
assigning a weight to the response based on the time period and the reputation score;
updating the first rating for the attribute descriptor based on the weight to generate an overall rating for the attribute descriptor;
generating new information for the second commercial object based on the overall rating for the attribute descriptor; and
storing the new information for the second commercial object in the historical database.

34. The computer-implemented method of claim 33, wherein the user-selectable option enables input of free text, and the computer-implemented method further comprising:
removing one or more stop words from the input of free text;
merging two or more synonyms in the input of free text; and
consolidating two or more quantifiers in the input of free text into a predetermined quantifier.

35. The computer-implemented method of claim 33, further comprising:
removing one or more stop words from the textual information;
merging two or more synonyms in the textual information;
identifying a sentiment in the textual information; and
combining two or more quantifiers in the textual information associated with the sentiment into a predetermined quantifier;
wherein the attribute descriptor includes the sentiment.

36. The computer-implemented method of claim 33, further comprising:
accessing consumer information associated with the consumer identifier; and
selecting the attribute descriptor based on the consumer information.

37. The computer-implemented method of claim 33, further comprising:
storing the first rating associated with the attribute descriptor on a non-transitory computer-readable medium, the storing of the first rating associated with the consumer identifier; and
determining a relevance score for a promotion for recommendation to the consumer computing device based on the first rating associated with the attribute descriptor.

38. The computer-implemented method of claim 33, further comprising:
determining the second commercial object based on consumer information of the consumer identifier associated with the consumer computing device.

39. A computer program product, stored on a computer readable medium, comprising instructions that when executed by one or more computers cause the one or more computers to:
access, from a historical database configured to store information related to a set of commercial objects associated with respective goods, services or promotions, textual information related to a first commercial object from the set of commercial objects, wherein the first commercial object is associated with a first good, service or promotion;
determine a first location associated with a consumer identifier;
select a second commercial object associated with a second good, service or promotion that is different than the first commercial object, wherein the second commercial object is selected based on a comparison between a second location associated with the second commercial object and the first location associated with the consumer identifier;
based on a textual analysis technique with respect to the textual information related to the first commercial object, programmatically generate an attribute descriptor for the second commercial object, wherein the textual analysis technique comprises parsing the textual information to define feature text information and quantifier text information for the first commercial object, and wherein the attribute descriptor is programmatically generated by replacing, based on the feature text information and the quantifier text information, at least a portion of the textual information with synonym text information to generate the attribute descriptor for the second commercial object;
in response to programmatically generating the attribute descriptor, configure a promotion application program with a survey query for the second commercial object, wherein the survey query is formatted to include the attribute descriptor and a user-selectable option configured to enable user input associated with the attribute descriptor, wherein the promotion application program is configured for repeated communication between a remote computing device and a consumer computing device to provide computer-executable functionality to the consumer computing device;
configure computer-executable instructions to cause a multi-point touch interface for a visual display of the consumer computing device to render (i) a graphical element associated with the second commercial object and (ii) the survey query formatted to include the attribute descriptor and the user-selectable option configured to enable the user input associated with the attribute descriptor;

determine a communication mode for the consumer computing device based on one or more communication capabilities associated with a processor of the consumer computing device;

transmit, via one or more network devices configured to establish a network connection between the consumer computing device and the remote computing device using the communication mode for the consumer computing device, the computer-executable instructions to the consumer computing device associated to initiate the promotion application program to establish the repeated communication between the remote computing device and the consumer computing device, and to provide the multi-point touch interface for the visual display of the consumer computing device; and in response to generation of a response to the survey query via the multi-point touch interface, generate, based on the response to the survey query, a first rating for the attribute descriptor that is programmatically generated for the second commercial object based on the textual analysis technique with respect to the textual information for the first commercial object;

receive a reputation score for the consumer identifier, wherein the reputation score is pre-determined based on one or more prior activities associated with the consumer identifier;

determine a time period of receipt of the response from the consumer computing device;

assign a weight to the response based on the time period and the reputation score;

update the first rating for the attribute descriptor based on the weight to generate an overall rating for the attribute descriptor;

generate new information for the second commercial object based on the overall rating for the attribute descriptor; and store the new information for the second commercial object in the historical database.

* * * * *

UNITED STATES PATENT AND TRADEMARK OFFICE
CERTIFICATE OF CORRECTION

| | | |
|---|---|---|
| PATENT NO. | : 11,250,450 B1 | |
| APPLICATION NO. | : 14/752311 | |
| DATED | : February 15, 2022 | |
| INVENTOR(S) | : Langdon et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 509 days.

Signed and Sealed this
Sixth Day of December, 2022

Katherine Kelly Vidal
*Director of the United States Patent and Trademark Office*